US009256387B2

(12) United States Patent
Nishizawa

(10) Patent No.: US 9,256,387 B2
(45) Date of Patent: Feb. 9, 2016

(54) PRINTING SYSTEM, PRINT SERVER, INFORMATION PROCESSING DEVICE, AND IMAGE FORMING DEVICE

(71) Applicant: KONICA MINOLTA, INC., Chiyoda-ku (JP)

(72) Inventor: Maiko Nishizawa, Amagasaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/340,692

(22) Filed: Jul. 25, 2014

(65) Prior Publication Data

US 2015/0029552 A1 Jan. 29, 2015

(30) Foreign Application Priority Data

Jul. 26, 2013 (JP) ................. 2013-155221

(51) Int. Cl.
*G06F 3/12* (2006.01)

(52) U.S. Cl.
CPC ............ *G06F 3/1253* (2013.01); *G06F 3/1203* (2013.01); *G06F 3/1208* (2013.01); *G06F 3/1219* (2013.01); *G06F 3/1239* (2013.01); *G06F 3/1285* (2013.01); *G06F 3/1288* (2013.01)

(58) Field of Classification Search
USPC ....................................................... 358/1.15
See application file for complete search history.

(56) References Cited

U.S. PATENT DOCUMENTS

| 2006/0177255 A1 | 8/2006 | Mizoi |
| 2006/0250631 A1 | 11/2006 | Igarashi |
| 2008/0246985 A1 * | 10/2008 | Patwardhan .......... G06F 3/1204 358/1.15 |
| 2013/0016395 A1 | 1/2013 | Akutsu |
| 2013/0135673 A1 | 5/2013 | Murakawa |

FOREIGN PATENT DOCUMENTS

| JP | 2003196046 | 7/2003 |
| JP | 2006221436 | 8/2006 |
| JP | 2006313494 | 11/2006 |
| JP | 2006-338237 A | 12/2006 |

(Continued)

OTHER PUBLICATIONS

Satoshi, Printer and Print Program, Print Method, Print Information Processor Print Information Processing Program and Print Information processing Method, Dec. 14, 2006, Machine Translated Japanese Patent Application Publication, JP2006338237, All Pages.*

(Continued)

*Primary Examiner* — Ngon Nguyen
(74) *Attorney, Agent, or Firm* — Buchanan Ingersoll & Rooney PC

(57) ABSTRACT

A print server includes: a storing part for storing a printing rule defining an output condition for printing; a notifying part for notifying an information processing device of the printing rule and a setting change process which can be changed by a user through user operation to select corresponding to the printing rule; and a job converting part for changing a print setting of the print job based on the setting change process selected by the user thereby converting the print job to the print job matching the printing rule. The information processing device includes: an acquiring part for acquiring the printing rule and information relating to the setting change process; and a setting changing part for changing the setting change process performed by the job converting part to a different process within a range matching the printing rule.

17 Claims, 19 Drawing Sheets

(56) References Cited

FOREIGN PATENT DOCUMENTS

| JP | 2007272764 | 10/2007 |
|---|---|---|
| JP | 2009140429 | 6/2009 |
| JP | 2013025413 | 2/2013 |
| JP | 2013114288 | 6/2013 |

OTHER PUBLICATIONS

Matsuzaki, Printing Control Device and Printing Control Method, Nov. 7, 2003, Japanese Patent Application Publication listed on IDS, JP2003-196046, All Pages.*

Kato, Information Processing Apparatus Printing Apparatus Output Control Method Storage Medium and Program, Oct. 18, 2003, Japanese Patent Application Publication listed on IDS, JP2007-272764, All Pages.*

Murakawa, Information Processing Unit Print Server Print Control System Print Control Method and Program, Oct. 6, 2013, Japanese Patent Application Publication listed on IDS, JP2013-114288, All Pages.*

Official Action issued in corresponding Japanese Patent Application No. 2013-155221; dated Jul. 7, 2015, with English translation. (14 pages).

* cited by examiner

FIG. 2

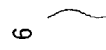

| USER | GROUP | PRINTING RULE | | |
|---|---|---|---|---|
| | | OUTPUT CONDITION | TARGET JOB | SETTING CHANGE PROCESS DEFAULT |
| USER A | — | PRINT IN BLACK AND WHITE (RESTRICT COLOR PRINT) | PRINT JOB OF COLOR DOCUMENT | CONVERT COLOR DOCUMENT TO BINARY FORMAT IMAGE |
| USER B | — | PRINT 2PAGES ON A SINGLE SHEET | PRINT JOB HAVING MULTIPLE PAGES | PLACE EVERY 2 PAGES ON LANDSCAPE SHAPED PRINTING SHEET FROM LEFT TO RIGHT AND CONVERT MARGIN OF CENTER TO WIDTH OF 30MM |
| — | GROUP X | PRINT AFTER ADDING WATERMARK | ALL PRINT JOBS | CONVERT TO ADD YELLOW "CONFIDENTIAL" TO CENTER OF DOCUMENT AT ANGLE OF 45 DEGREES |

FIG. 3

| PRINTING RULE (OUTPUT CONDITION) | SETTING CHANGE PROCESS | SELECTIVE CONDITION |
|---|---|---|
| PRINT IN BLACK AND WHITE (RESTRICT COLOR PRINT) | • CONVERT COLOR DOCUMENT TO BINARY FORMAT IMAGE | YES |
| | • CONVERT COLOR DOCUMENT TO GREY SCALE RAMP | NO |
| | • CONVERT COLOR CHARACTER IN COLOR DOCUMENT TO BLACK AND UNDERLINE | NO |
| | • CONVERT COLOR CHARACTER IN COLOR DOCUMENT TO BLACK AND BOLD FONT | NO |
| PRINT 2PAGES ON A SINGLE SHEET | • PLACE PAGES ON LANDSCAPE SHAPED PRINTING SHEET FROM LEFT TO RIGHT AND CONVERT MARGIN OF CENTER TO WIDTH OF 30MM | YES |
| | • PLACE PAGES ON LANDSCAPE SHAPED PRINTING SHEET FROM LEFT TO RIGHT AND CONVERT MARGIN OF CENTER TO WIDTH OF 15MM | NO |
| | • PLACE PAGES ON PORTRAIT SHAPED PRINTING SHEET FROM TOP TO BOTTOM AND CONVERT MARGIN OF CENTER TO WIDTH OF 30MM | NO |
| PRINT AFTER ADDING WATERMARK | • CONVERT TO ADD YELLOW "CONFIDENTIAL" TO CENTER OF DOCUMENT AT ANGLE OF 45 DEGREES | YES |
| | • CONVERT TO ADD RED "RESTRICT" TO CENTER OF DOCUMENT AT ANGLE OF 45 DEGREES | NO |
| | • ADD BLACK "FOR INTERNAL USE ONLY" IN MARGIN OF DOCUMENT AT ANGLE OF 0 DEGREE OF ROTATION | NO |

FIG. 4A

8a(8)

| PRINT IN BLACK AND WHITE (RESTRICT COLOR PRINT) ||
|---|---|
| SUBJECT OF CHANGE | MATCHED PROCESS |
| • COLOR CHARACTER | • BLACK |
| • RED CHARACTER | • BLACK AND UNDERLINE |
| • BLUE CHARACTER | • BLACK AND BOLD FONT |
| • YELLOW CHARACTER | • BLACK AND BOX |
| • GREEN CHARACTER | • BLACK AND ITALIC FACE |
| • ORANGE CHARACTER | • GREY SCALE RAMP |
| • PINK CHARACTER | • GREY SCALE RAMP AND UNDERLINE |
| ⋮ | ⋮ |
| • COLOR IMAGE | • BLACK<br>• GREY SCALE RAMP |

8 c (8)

| PRINT AFTER ADDING WATERMARK ||
|---|---|
| SUBJECT OF CHANGE | MATCHED PROCESS |
| • POSITION | • CENTER OF DOCUMENT<br>• MARGIN OF DOCUMENT<br>• TOP EDGE OF DOCUMENT<br>• BOTTOM OF DOCUMENT |
| • MARK | • CONFIDENTIAL<br>• RESTRICT<br>• FOR INTERNAL USE ONLY |
| • COLOR | • GREY<br>• RED<br>⋮ |

PRINTING SYSTEM 1

PRINTING SYSTEM, PRINT SERVER, INFORMATION PROCESSING DEVICE, AND IMAGE FORMING DEVICE

This application is based on the application No. 2013-155221 filed in Japan, the contents of which are hereby incorporated by reference.

BACKGROUND OF THE INVENTION

1. Field of the Invention

The present invention relates to a printing system, a print server, an information processing device and an image forming device. The present invention more specifically relates to a technique of controlling printing process performed based on a printing rule.

2. Description of the Background Art

For producing a printed output such as a document, a rule which is registered in advance is conventionally applied based on information included in a print job and the printed output is produced in accordance with a result of application of the printing rule. The printing rule defining print settings for each print purpose is registered in advance with a printer. This known technique is introduced for example in Japanese Patent Application Laid-Open No. JP 2006-338237 A. According to this known technique, in response to receiving the print job, the printer specifies the print purpose based on template information included in the received print job. The printer applies the printing rule corresponding to the specified print purpose and configures the print settings such as printing double sided and/or printing multiple pages on a single sheet, thereby producing the printed output. According to the conventional known technique, the printing rule applied at production of the printed output is set for reducing the number of printed sheets, resulting in lower printing costs.

When producing the printed output by forcibly applying the printing rule to the print job, the printed output is sometimes produced in a way a user does not intend. It is assumed, for instance, that the conventional printing rule is applied to the print job as described above to automatically configure settings to print double sided and two pages on a single sheet. In this case, even though the user intends to have multiple pages in the document printed on both sides of each printing sheet to cause the printed outputs arranged according to page number for binding, the document is printed double sided of each printing sheet in order from front page of the document to back. In such a case, the printed output is not produced in a way the user intends. Therefore, the printed output may be wasted, and printing costs cannot be reduced.

In the future, by having a rule to produce the printed output with a black toner even for the job to print a document in color, for instance, as the printing rule, it is considered to control the amount of consumed color toners, thereby reducing the printing costs. In such a case, however, even when a user sets a variety of colors with character strings that he or she wants to highlight at document creation, the printing rule may be applied at printing. The character strings with which the variety of colors are set are printed in black, which is the same as the other character strings. As a result, the printed output which does not make difference between the character strings the user wants to highlight and the others is produced. In such a case, the printed output is not produced in a way the user intends. Therefore, also in this case, the printed output may be wasted, and the printing costs cannot be reduced.

SUMMARY OF THE INVENTION

The present invention is intended to solve the above problems. Thus, the present invention is intended to provide a printing system, a print server, an information processing device and an image forming device capable of preventing a printed output from being produced in a way a user does not intend for producing the printed output by applying a printing rule.

First, the present invention is directed to a printing system comprises an information processing device, a print server and an image forming device. The print server receives a print job sent from the information processing device and the print job received by the print server is output to the image forming device so that printing process is performed.

According to an aspect of the printing system, the print server includes: a storing part for storing a printing rule defining an output condition for printing; a notifying part for notifying the information processing device of the printing rule and a setting change process which can be changed by a user through user operation to select corresponding to the printing rule in response to receiving a notification request from the information processing device; and a job converting part for changing a print setting of the print job based on the setting change process selected by the user in response to receiving the print job from the information processing device, thereby converting the print job to the print job matching the printing rule. The information processing device includes: an acquiring part for acquiring the printing rule and information relating to the setting change process by sending the notification request to the print server; a display part on which the printing rule and the detail of the setting change process are displayed based on the information acquired by the acquiring part; a setting changing part for changing the setting change process performed by the job converting part to a different process within a range matching the printing rule in response to the user operation to select as the information is being displayed on the display part; and a transmitting part for sending the setting change process selected by the user through the setting changing part to the print server.

Second, the present invention is directed to a printing system comprises a print server and an image forming device. The print server outputs the print job to the image forming device in response to a request from the image forming device so that printing process is performed.

According to an aspect of the printing system, the print server includes: a job storing part for storing the print job; a printing rule storing part for storing a printing rule defining an output condition for printing; a notifying part for notifying the information processing device of the printing rule and a setting change process which can be changed by a user through user operation to select corresponding to the printing rule in response to receiving a notification request from the image forming device; and a job converting part for changing a print setting of the print job based on the setting change process selected by the user in response to receiving a request for sending the print job stored in the job storing part from the information processing device, thereby converting the print job to the print job matching the printing rule. The image forming device includes: an acquiring part for acquiring the printing rule and information relating to the setting change process by sending the notification request to the print server; a display part on which the printing rule and the detail of the setting change process are displayed based on the information acquired by the acquiring part; a setting changing part for changing the setting change process performed by the job converting part to a different process within a range matching the printing rule in response to the user operation to select as the information is being displayed on the display part; and a transmitting part for sending the setting change process selected by the user through the setting changing part to the print server.

Third, the present invention is directed to a print server receiving a print job over a network and outputting the print job to an image forming device connected to the network.

According to one aspect of the print server, the print server, comprises: a storing part for storing a printing rule defining an output condition for printing; a notifying part for notifying a sender of a notification request of the printing rule and a setting change process which can be changed by a user through user operation to select corresponding to the printing rule in response to receiving the notification request over the network; and a job converting part for changing a print setting of the print job based on the setting change process selected by the user at receipt or transmission of the print job, thereby converting the print job to the print job matching the printing rule.

Fourth, the present invention is directed to an information processing device sending a print job to a print server capable of processing the print job based on a printing rule.

According to one aspect of the information processing device, the information processing device, comprises: an acquiring part for acquiring from the print server, in response to sending a notification request to the print server, the printing rule and information relating to a setting change process performed when a print setting of the print job not matching the printing rule is changed on the print server; a display part on which the printing rule and the detail of the setting change process performed by the print server are displayed based on the information acquired by the acquiring part; a setting changing part for changing the setting change process performed by the print server to a different process within a range matching the printing rule in response to user operation to select as the information is being displayed on the display part; and a transmitting part for sending the setting change process selected by the user through the setting changing part to the print server.

Fifth, the present invention is directed to an image forming device requesting for a print job to a print server capable of processing the print job based on a printing rule and performing printing process based on the print job received from the print server.

According to one aspect of the image forming device, the image forming device, comprises: an acquiring part for acquiring from the print server, in response to sending a notification request to the print server, the printing rule and information relating to a setting change process performed when a print setting of the print job not matching the printing rule is changed on the print server; a display part on which the printing rule and the detail of the setting change process performed by the print server are displayed based on the information acquired by the acquiring part; a setting changing part for changing the setting change process performed by the print server to a different process within a range matching the printing rule in response to user operation to select as the information is being displayed on the display part; and a transmitting part for sending the setting change process selected by the user through the setting changing part to the print server.

BRIEF DESCRIPTION OF THE DRAWINGS

FIG. 2 is an example of rule information;
FIG. 3 shows an example of setting change registration information;
FIGS. 4A, 4B and 4C show an example of determination information.

DESCRIPTION OF THE PRESENT PREFERRED EMBODIMENTS

Figure 1:
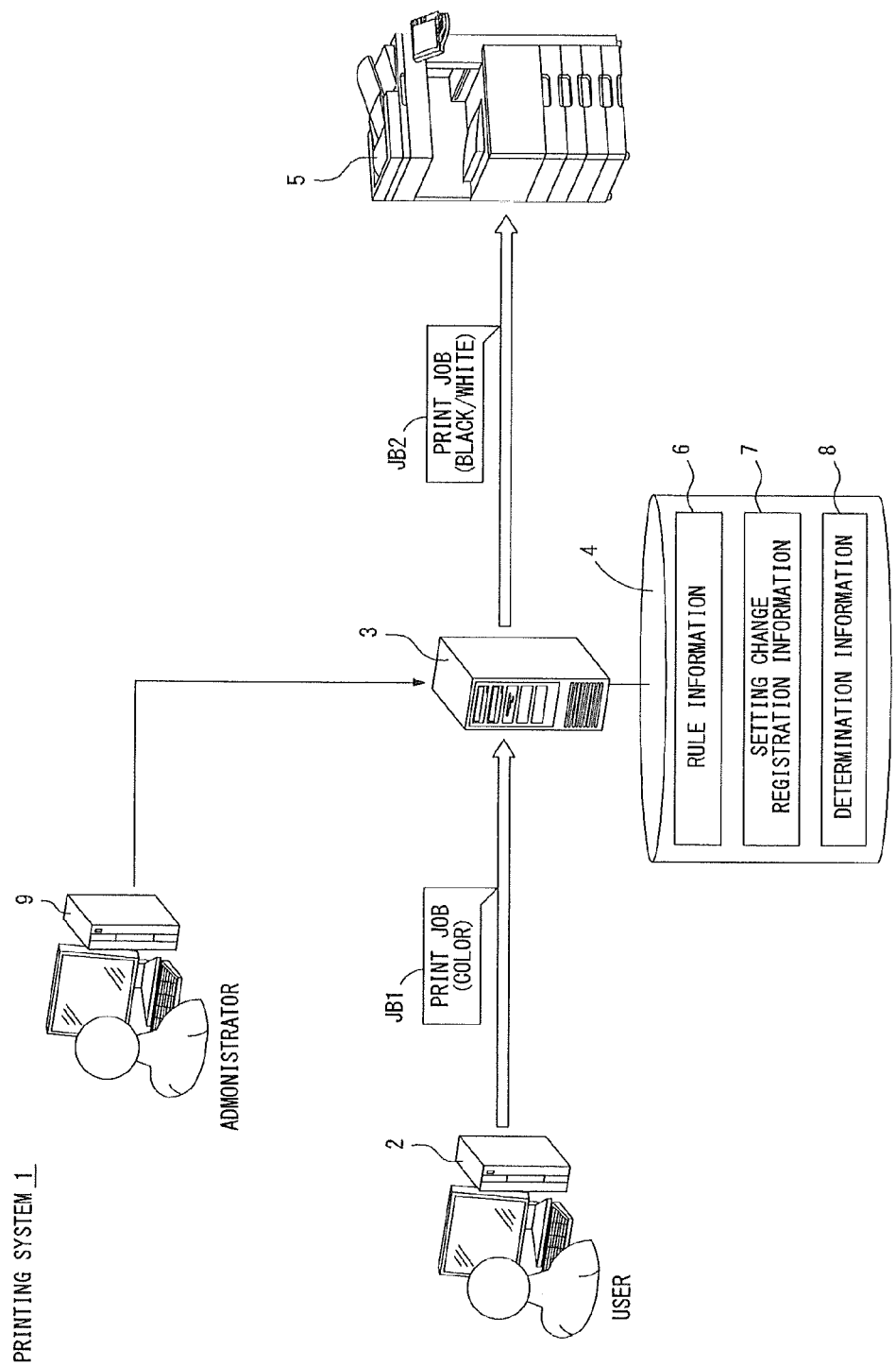
FIG. 1 shows an exemplary configuration of a printing system of a first present preferred embodiment.

Preferred embodiments of the present invention are described in detail below with reference to figures. In the description given below, those elements which are shared in common among figures are represented by the same reference numerals, and these elements are not discussed repeatedly for the same description.

First Preferred Embodiment

The first preferred embodiment of the present invention is described first. FIG. 1 shows an exemplary configuration of a printing system 1 of the first present preferred embodiment of the present invention. The printing system 1 is a network system comprising more than one information processing device 2 and 9, a print server 3 and an image forming device 5. This network system is established in an office, for instance, to perform printing process. On the printing system 1, each of the information processing devices 2 and 9, the print server 3 and the image forming device 5 is capable of establishing wired or radio data communication over a network such as LAN (Local Area Network).

The information processing devices 2 and 9 are formed from general computers (PC), for example. With the information processing device 2 of the information processing devices, the user edits and creates a document to print, for instance, and outputs a print job JB1 to the print server 3. The information processing device 9 is used by an administrator to register various types of information with the print server 3.

The image forming device 5 is formed from a device such as one of MFPs (Multifunction Peripherals). The image forming device 5 includes print function to produce a printed output by forming images, for instance, based on the print job input over the network. The image forming device 5 is equipped with multiple colors of toners or inks. When the input job specifies printing in color, the image forming device 5 forms images with multiple colors to print in color. When the input print job specifies printing in black and white, the image forming device 5 forms images with only black to print in black and while. The image forming device 5 is also capable of automatically printing multiple pages of a document on a single sheet or printing double sided, for example, based on the print settings of the input print job. Furthermore, the image forming device 5 is capable of adding a certain image (such as watermarks or character strings) for printing based on the print settings.

The print server 3 centrally controls the print job JB1 output from the information processing device 2 of the printing system 1 and controls printing to meet a printing rule set in advance in producing a printed output with the image forming device 5. To be more specific, the print server 3 determines whether or not the print job JB1 received from the information processing device 2 matches the printing rule set in advance. As a result of the determination, the print job JB1 may match the printing rule. In this case, the print server 3 outputs the received print job JB1 to the image forming device 5 as it is. For the print job JB1 that does not meet the printing rule, the print server 3 converts the print job JB1 to a print job JB2 to meet the printing rule and outputs to the image forming device 5.

The print server 3 includes a nonvolatile storage device 4 formed from a device such as a hard disk device. The storage device 4 is capable of storing therein the print job JB1 received by the print server 3. The storage device 4 also stores therein a variety of information registered by the administrator. As shown in FIG. 1, for instance, rule information 6, setting change registration information 7 and determination information 8 is stored in the storage device 4. The administrator uses the information processing device 9 to register in advance such information with the print server 3.

A variety of printing rules is registered as the rule information 6. FIG. 2 is an example of the rule information 6. As shown in FIG. 2, the variety of printing rules is registered for each user or group as the rule information 6. More specifically, the printing rule may be set for each user separately, or set commonly for each group to which multiple users are belonged. Alternatively, the printing rule may be the one uniformly applied to all users, for example. Output conditions (output manner) applied for producing the printed output are defined in advance as the printing rule. Setting change process set in advance to change print settings of a print job that does not match the output conditions is registered with the printing rule.

In the example of FIG. 2, it is defined in the printing rule set for a user A to print in black and white as the output condition. In this printing rule, prevention of color print is defined. As the setting change process to change the print settings of the print job for the print job which does not match the output condition, process to convert the document in color to binary format image is registered in advance as default with the printing rule. It is assumed, for instance, the user A uses the information processing device 2 to output the print job JB1 to produce the printed output in color based on the color document to the print server 3 as shown in FIG. 1. In this case, the print server 3 determines that the print job JB1 does not match the printing rule set for the user A. The print server 3 then converts the color document contained in the print job JB1 to the data of binary format image based on the setting change process registered as default with the printing rule. As a result, the print job JB1 for printing in color which does not match the printing rule is converted to a print job JB2 for printing in black and white matches the printing rule. Such printing rule is aimed for controlling the printing costs by restricting color printing.

In the example of FIG. 2, it is defined in the printing rule set for a user B to print two pages on a single sheet as the output condition. This printing rule specifies printing two pages of a document on a single printing sheet, and it defines prevention of printing one page on a single printing sheet. As the setting change process to change the print settings of the print job for the print job which does not match the output condition, process to convert the print setting of the print job containing multiple pages is registered in advance as default. The registered process is to place every two pages on a landscape shaped printing sheet from left to right and convert the margin of the center to a width of 30 mm. It is assumed, for instance, the user B uses the information processing device 2 to output the print job JB1 to produce the printed output based on the print job JB1 for printing the document containing multiple pages on a single sheet to the print server 3. In this case, the print server 3 determines that the print job JB1 does not match the printing rule set for the user B. The print server 3 then converts the print setting of the print job JB1 based on the aforementioned setting change process registered as default with the printing rule. If, however, the user B uses the information processing device 2 to set in advance printing two pages on a single sheet, the print job output from the information processing device 2 to the print server 3 matches the printing rule set for the user B. In such a case, the print server 3 outputs the received print job as it is to the image forming device 5 without performing the process to change the print setting. Such printing rule is aimed for controlling the printing costs by reducing the number of the printed output to be produced.

In the example of FIG. 2, it is defined in the printing rule set for a group X to print after adding a watermark as the output condition. This printing rule restricts printing without adding the watermark. As the setting change process to change the print settings of the print job for the print job which does not match the output condition, a process to change the setting to add a predetermined watermark to a predetermined position of a document at a certain angle of rotation is registered. In the example of FIG. 2, the setting to add a yellow character string image "Confidential" to the center of the document at an angle of 45 degrees is registered as default. It is assumed, for instance, a user who belongs to the group X uses the information processing device 2 to output the print job JB1 to produce the printed output without adding the watermark to the print server 3. In this case, the print server 3 determines that the print job JB1 does not match the printing rule set for the group X. The print server 3 then converts the print setting of the print job JB1 based on the aforementioned setting change process registered as default with the printing rule. If, however, the user uses the information processing device 2 to configure in advance the print setting to add the watermark, the print job JB1 output from the information processing device 2 to the print server 3 matches the printing rule set for the group X. In such a case, the print server 3 outputs the received print job as it is to the image forming device 5 without performing the process to change the print setting. Such printing rule is aimed for calling users' attentions to handle produced printed outputs and preventing divulging of information by adding the watermark such as "Confidential" at printing.

As described above, in response to receiving the print job JB1 over the network, the print server 3 determines whether or not the received print job JB1 matches the printing rule set in advance for the user based on the rule information 6. For the job which does not match the printing rule, the print server 3 changes the print setting of the print job JB1 based on the setting change process set in advance, thereby automatically converting to the print job JB2 which matches the printing rule. The print job is automatically converted on the print server 3 so that the printed output may be produced in a way the user does not intend. In order to prevent production of the printed output in a way the user does not intend, according to the first preferred embodiment, the user is allowed to check in advance the printing rule and change freely the default setting change process registered with the rule information 6 to another process within a certain definite range.

More than one setting change process that may be selected freely by the user and changed set for each printing rule (output condition) defined in the rule information 6 is registered in advance as the setting change registration information 7. FIG. 3 shows an example of the setting change registration information 7. In the example of FIG. 3, four setting change processes are registered in advance by the administrator for the printing rule to print in black and white. Three setting change processes are registered in advance by the administrator for the printing rule to print two pages on a single sheet. Three setting change processes are registered in advance by the administrator for the printing rule to print with adding the watermark. Through each of the more than one setting change process registered for the respective printing rules, the print setting is changed within the range matching the printing mile. For the printing rule to print in black and white, even when any of the four setting change processes is performed, the printed output is produced in black and white with only black ink or toner; hence the setting may be changed within the range matching the printing rule. Each of the more than one setting change process registered for the respective printing rules allows changing the print setting of the print job to a different setting within the range matching the printing rule, and is an option for setting change process for changing the print setting within the range matching the printing rule. The setting change process which has "YES" with its selective condition of the more than one setting change process registered for the respective printing rules is the process registered in advance with the rule information 6 as default.

The user is allowed to select freely the process performed when the print job is automatically converted based on the printing rule set for him or her among from the multiple setting change processes registered as the setting change registration information 7. The user selects one of the multiple setting change processes and changes the setting change process set as default with the rule information 6. A field showing the selective condition of FIG. 3 is then updated, hence the rule information 6 of FIG. 2 is updated. As described above, the user selects one of the multiple setting change processes registered as the setting change registration information 7. As a result, according to the first preferred embodiment, when the print job is automatically converted on the print server 3, the user is allowed to make the process he or she desires within a range matching the printing rule.

The user is also allowed to newly register the setting change process set as default in the rule information 6. The setting change process set as default is not necessarily specified among from the multiple setting change processes registered as the setting change registration information 7. In this case, the print server 3 determines if the setting change process newly specified by the user is within the range matching the printing rule. When the setting change process newly specified by the user is within the range matching the printing rule, the new setting change process is registered as the setting change registration information 7. Also, the setting change process set as default in the rule information 6 of FIG. 2 is updated to the new setting change process. When the setting change process newly specified by the user is not within the range matching the printing rule, the registration of the new setting change process is restricted.

Figure 4B:
Figure 4C:

The determination information 8 is referred for the aforementioned determination. FIGS. 4A, 4B and 4C show an example of the determination information 8. FIG. 4A shows an example of the determination information 8a referred for determining whether or not the process matches the printing rule to print in black and white. FIG. 4B shows an example of the determination information 8b referred for determining whether or not the process matches the printing rule to print two pages on a single sheet. FIG. 4C shows an example of the determination information 8c referred for determining whether or not the process matches the printing rule to print after adding the watermark. Each of the aforementioned determination information 8a, 8b and 8c includes subject of change and corresponding process (matched process) of changing the subject of change within the range matching the printing rule.

The print server 3 determines if the setting change process newly registered by the user is within the range matching the printing rule. For the determination, the print sever 3 determines whether or not an item to change specified by the user is registered as the subject of change in the respective determination information 8a, 8b and 8c, and a setting change value specified by the user is registered as the matched process with the respective determination information 8a, 8b and 8c. The setting change value specified by the user may be registered as the matched process with the respective determination information 8a, 8b and 8c. In this case, the print server 3 registers the new setting change process specified by the user.

For the printing rule to print in black and white, for instance, "colored character" other than black may be specified by the user as the subject of change and "black and box" may be specified as the setting change value to highlight the colored character in black and decorate. In this case, the print server 3 refers to the determination information 8a. The new process specified by the user is registered in advance as the matched process with the determination information 8a. Thus, the print server 3 is allowed to determine that the new process specified by the user is within the range matching the printing rule. The print server 3 then registers the new setting change process as the setting change registration information 7, and updates the setting change process set as default with the rule information 6 of FIG. 2 to the new setting change process. For the printing rule to print in black and white, the user is also allowed to specify the colored character other than black by each color as the subject of change. With the determination information 8a illustrated in FIG. 4A, for instance, characters in various colors such as "red character," "blue character" and "yellow character" are registered separately in advance as the subject of change. The user specifies the setting change value for different highlight with characters in each color, thereby newly registering the setting change process to change, for example, "red character" in the document to "black and underline," "blue character" to "black and bold font" and "yellow character" to "black and box."

For the printing rule to print two pages on a single sheet, the user may specify the new setting change process. The print server 3 then refers to the determination information 8b of FIG. 4B. The print server 3 determines whether or not the new setting change process specified by the user is within the range matching the printing rule. For the printing rule to print after adding the watermark, the user may specify the new setting change process. The print server 3 then refers to the determination information 8c of FIG. 4C. The print server 3 determines whether or not the new setting change process specified by the user is within the range matching the printing rule. When the new setting change process is specified by the user, the print server 3 is allowed to automatically determine whether or not the setting change process matches the printing rule based on the respective determination information 8a, 8b and 8c, thereby automatically registering the new setting change process.

The setting change process not registered in advance as the matched process with the respective determination information 8a, 8b and 8c may be specified by the user. In this case, the print server 3 is not allowed to determine whether or not the setting change process matches the printing rule. The print server 3 sends the new setting change process specified by the user to the information processing device 9 to inquiry at the administrator whether or not the setting change process matches the printing rule. Based on the answer from the information processing device 9, the print server 3 determines whether or not the setting change process newly registered by the user matches the printing rule. If it does not match the printing rule, the registration of the new setting change process is restricted.

Figure 5:
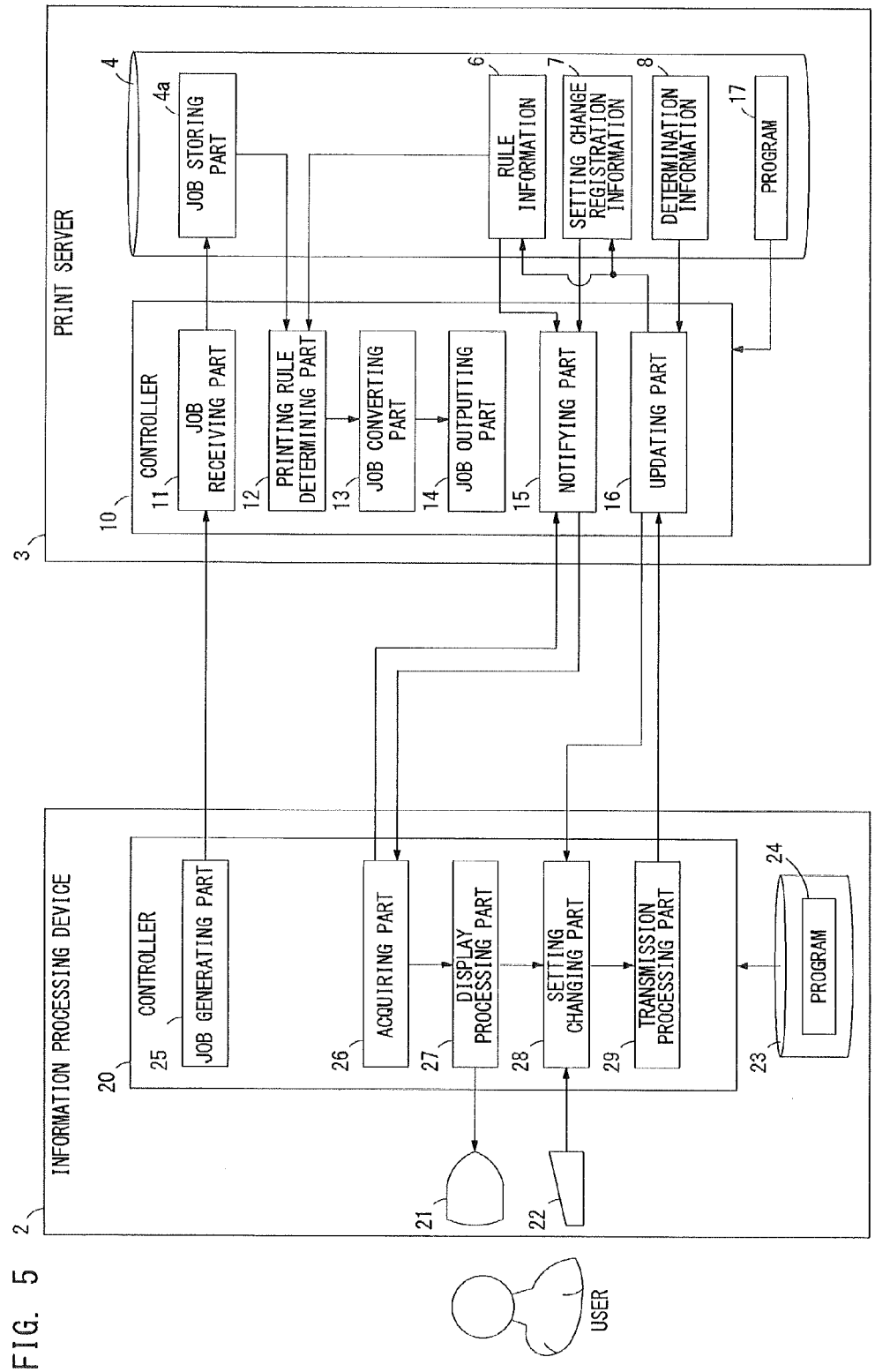
FIG. 5 is a block diagram showing an exemplary hardware configuration and functional configuration of the printing system of the first preferred embodiment.

The configuration that allows the user to check in advance the printing rule and to change freely the setting change process set as default defined in the rule information 6 within the range matching the printing rule is described in detail next. FIG. 5 is a block diagram showing an exemplary hardware configuration and functional configuration of the printing system 1 of the first preferred embodiment. FIG. 5 does not show the image forming device 5 and the information processing device 9 used by the administrator.

As illustrated in FIG. 5, the information processing device 2 includes a controller 20, a display unit 21, a manipulation input unit 22 and a storage unit 23. The controller 20 includes a CPU (Central Processing Unit) and a memory. The display unit 21 is formed from a device such as a liquid crystal display, for example, and the manipulation input unit 22 is formed with parts such as a keyboard and/or mouse, for example. The storage unit 23 is formed from a device such as a hard disk device. The storage unit 23 stores therein a program 24 installed in advance, and the program 24 is executed by the CPU of the controller 20. The CPU executes the program 24, and the controller 20 serves as a job generating part 25, an acquiring part 26, a display processing part 27, a setting changing part 28 and a transmission processing part 29.

The print server 3 includes a controller 10 and the aforementioned storage device 4. The controller 10 includes a CPU and a memory. The storage device 4 stores therein in advance the above-described rule information 6, the setting change registration information 7 and the determination information 8. The storage device 4 includes a job storing part 4a in which the print job JB1 received from the information processing device 2 is stored. The storage device 4 also stores therein a program 17 installed in advance. The program 17 is executed by the CPU of the controller 10. The CPU executes the program 17, and the controller 10 serves as a job receiving part 11, a printing rule determining part 12, a job converting part 13, a job outputting part 14, a notifying part 15 and an updating part 16.

The job generating part 25 of the information processing device 2 generates the print job JB1 in response to a user instruction to print. The user instruction to print may be detected as a document edit application is running on the information processing device 2, for example. In such a case, the job generating part 25 generates the print job JB1 based on the document in a file opened with the document edit application. The document opened with the document edit application may contain the colored character. In this case, the job generating part 25 generates the color print job JB1. In response to generating the print job JB1, the job generating part 25 sends the generated print job JB1 to the print server 3. The print job JB1 thereby sent contains adjunct information such as information relating to the user who gave the print job JB1, information relating to the group of the user and/or a name of the file to print.

The job receiving part 11 of the print server 3 receives the print job JB1 over the network. In response to receiving the print job JB1 from the information processing device 2, the job receiving part 11 temporarily stores the received print job JB1 in the job storing part 4a. In response to receiving the print job JB1, the job receiving part 11 brings the rule determining part 12 into operation.

The rule determining part 12 reads the print job JB1 in the job storing part 4a and identifies the user who gave the print job JB1 and the group to which the user belongs. Also, the rule determining part 12 reads the rule information 6 and specifies the printing rule applied to the user who gave the print job JB1 or the group. The rule determining part 12 analyzes the print job JB1 received from the information processing device 2, thereby determining whether or not the print job JB1 matches the printing rule. For the print job JB1 matching the printing rule, the rule determining part 12 allows the job outputting part 14 to output the print job JB1. For the print job JB1 not matching the printing rule, the rule determining part 12 brings the job converting part 13 into operation.

The job converting part 13 changes the print setting of the print job JB1 not matching the printing rule based on the default setting change process registered with the rule information 6, thereby automatically converting the print job JB1 to the print job JB2 matching the printing rule. After converting the print job JB1 received from the information processing device 2 to the print job JB2 matching the printing rule, the job converting part 13 allows the job outputting part 14 to output the print job JB2.

The job outputting part 14 outputs the print job JB1 or JB2 the output of which is allowed by the rule determining part 12 or the job converting part 13 to the image forming device 5.

The acquiring part 26 of the information processing device 2 sends a request for notification of the printing rule (hereafter, printing rule notification request or notification request) to the print server 3, thereby acquiring the printing rule applied to the user of the information processing device 2 and information relating to the printing rule from the print server 3. The notification request sent by the acquiring part 26 to the print server 3 includes the information relating to the user of the information processing device 2, the information relating to the group of the user and/or the name of the file to print, for instance. The information relating to the printing rule acquired from the print server 3 includes, for instance, information relating to the default setting change process for automatic conversion of the print job to match the printing rule and options for the multiple setting change processes registered with the setting change registration information 7. The information is also relating to the setting change process that can be changed when selected by the user.

The notifying part 15 of the print server 3 sends the printing rule applied to the user of the information processing device 2 and the information relating to the printing rule to the information processing device 2 in response to the notification request from the information processing device 2. In response to receiving the notification request from the information processing device 2, the notifying part 15 identifies the user of the information processing device 2 and the user's group. The notifying part 15 then extracts the printing rule set for the identified user and the information relating to the printing rule in the rule information 6 and the setting change registration information 7, and sends the extracted information to the information processing device 2.

After the acquiring part 26 of the information processing device 2 acquires the printing rule and the information relating to the printing rule, the display processing part 27 of the information processing device 2 becomes operative. The display processing part 27 displays the information such as the printing rule received from the print server 3 on the screen of the display unit 21. Through the display process by the display processing part 27, information including the detail of the printing rule applied to the user of the information processing device 2 and/or the detail of the setting change process automatically performed on the print server 3 for the print job not matching the printing rule is displayed on the screen of the display unit 21. Thus, the user is allowed to check in advance whether or not the printed output is produced in a way the user intends by the image forming device 5. When the user determines that the printed output is produced in a way the user does not intend, he or she is allowed to change the setting change process performed on the print server 3 to another process. The user, however, is not capable of changing the printing rule itself applied to him or her.

The setting changing part 28 changes the setting change process set as default to be performed on the print server 3 to another process in response to user operation given through the manipulation input unit 22. When the setting change process specified by the user is the process registered in advance with the setting change registration information 7, the setting changing part 28 changes the setting change process performed at the job conversion on the print server 3 to the process specified by the user. The setting change process specified by the user may be the new process not registered with the setting change registration information 7. In this case, the setting changing part 28 is not capable of determining whether or not the new process is within the range matching the printing rule. The setting changing part 28, therefore, puts the transmission processing part 29 into operation to inquiry at the print server 3 whether or not the new process specified by the user is within the range matching the printing rule.

In response to receiving the inquiry whether or not the new process matches the printing rule from the information processing device 2, the updating part 16 of the print server 3 refers to the determination information 8 to determine if the new process specified by the user is within the range matching the printing rule. When it is determined that the process matches the printing rule, the updating part 16 notifies the setting changing part 28 of the information processing device 2 of the determination result and allows the setting change. When it cannot be determined with the determination information 8 that the process matches the printing rule, the updating part 16 sends an inquiry at the administrator of the information processing device 2 whether or not the process matches the printing rule. The inquiry at the administrator of the information processing device 2 is made by sending an email to an address of the administrator, for example. The updating part 16 determines if the process matches the printing rule based on a response from the administrator. If the process matches the printing rule, the updating part 16 notifies the setting changing part 28 of the information processing device 2 of the determination result and allows the setting change. If the process does not match the printing rule, the updating part 16 notifies the setting changing part 28 of the information processing device 2 of the determination result and restricts the setting change.

A response to allow the setting change may be received from the print server 3 after sending the inquiry at the print server 3. In this case, the setting changing part 28 of the information processing device 2 changes the setting change process performed at the job conversion on the print server 3 to the new process specified by the user. The response received from the print server 3 may restrict the setting change. In this case, the setting changing part 28 discards the new process specified by the user. After that, the user makes the operation to establish the setting change process performed at the job conversion on the print server 3, and the setting changing part 28 puts again the transmission processing part 29 into operation to send the request for updating the setting change process performed at the job conversion on the print server 3 to the process specified by the user to the print server 3. The update request thereby sent includes the information relating to the setting change process specified by the user.

In response to receiving the update request from the information processing device 2, the updating part 16 of the print server 3 updates the setting change value registered as default in the rule information 6 and updates the setting change registration information 7. When the new setting change process matching the printing rule is specified with the update request, the new setting change process is additionally registered as the setting change registration information 7.

As described above, the acquiring part 26, the display processing part 27, the setting changing part 28 and the transmission processing part 29 of the information processing device 2 become operative and the notifying part 15 and the updating part 16 of the print server 3 become operative. As a result, the user of the information processing device 2 is allowed to check the printing rule applied to him or her and change the default setting change process registered with the rule information 6 to the desired process within the range matching the printing rule. In order to effectively prevent unnecessary production of the printed output by the image forming device 5, the process by the aforementioned acquiring part 26, the display processing part 27, the setting changing part 28 and the transmission processing part 29 may preferably be performed before the print job JB2 is output to the image forming device 5 from the print server 3, for example. When, therefore, the user instruction to print is detected by the information processing device 2, the acquiring part 26, the display processing part 27, the setting changing part 28 and the transmission processing part 29 are put into operation first. The job generating part 25 preferably becomes operative after completing the user operation to check the printing rule.

Figure 6:
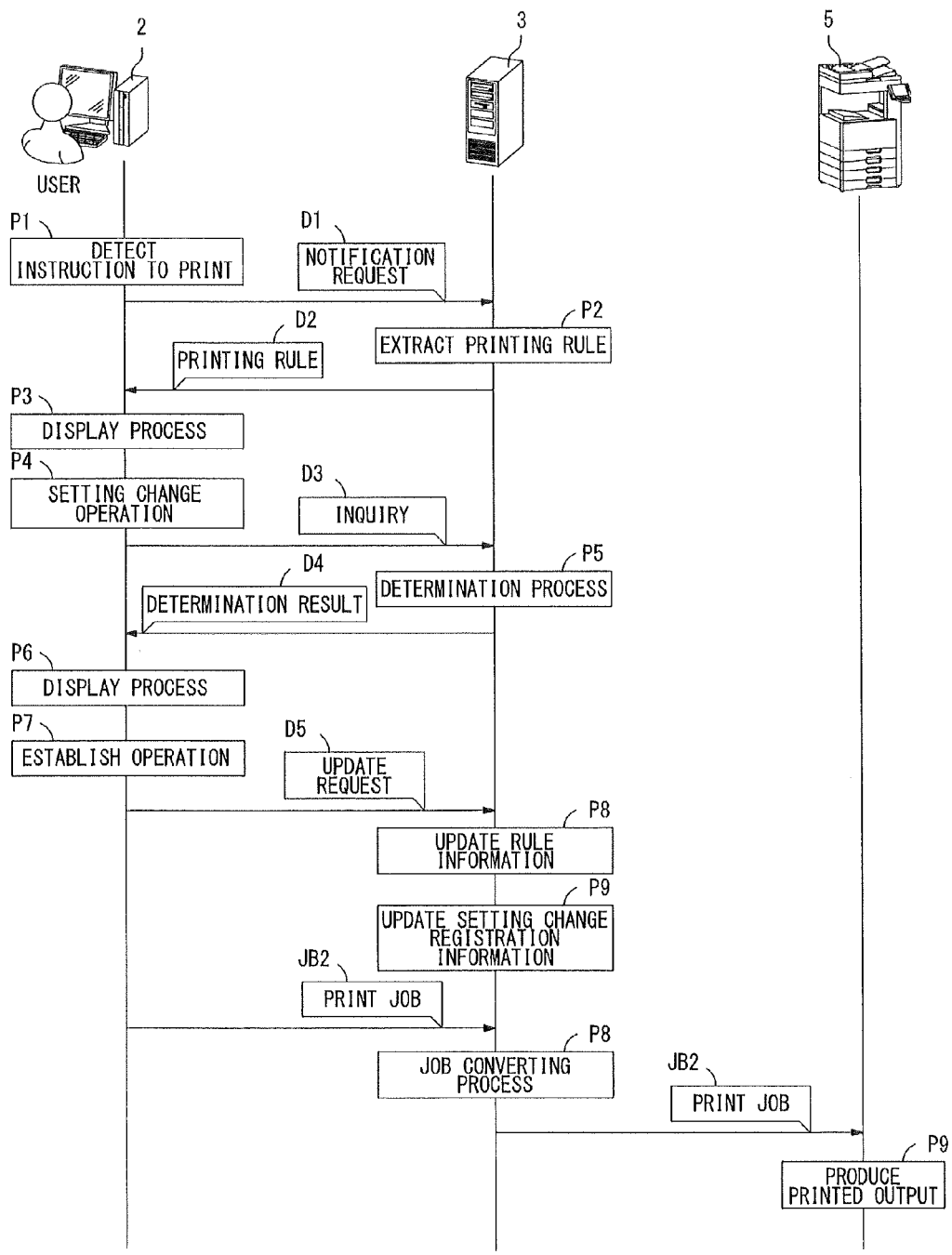
FIG. 6 shows concepts of the process flow performed by each device on the printing system of the first preferred embodiment.

FIG. 6 shows concepts of the process flow performed by each device on the printing system 1 of the first preferred embodiment. Each of FIGS. 7A, 7B and 7C and FIGS. 8A and 8B is an example of a screen displayed on the information processing device 2 in the process of carrying out the process of FIG. 6.

After the user instruction to print is detected on the information processing device 2 (process P1) as shown in FIG. 6, a printing rule notification request D1 is sent to the print server 3 from the information processing device 2. In response to receiving the notification request D1, the print server 3 extracts a printing rule D2 set for the user of the information processing device 2 (process P2), and sends the extracted printing rule D2 to the information processing device 2. The printing rule D2 sent to the information processing device 2 from the print server 3 includes not only the printing rule corresponding to the user but also the information relating to the printing rule. In response to receiving the printing rule D2 from the print server 3, the information processing device 2 performs the display process based on the received printing rule D2 (process P3).

Figure 7A:
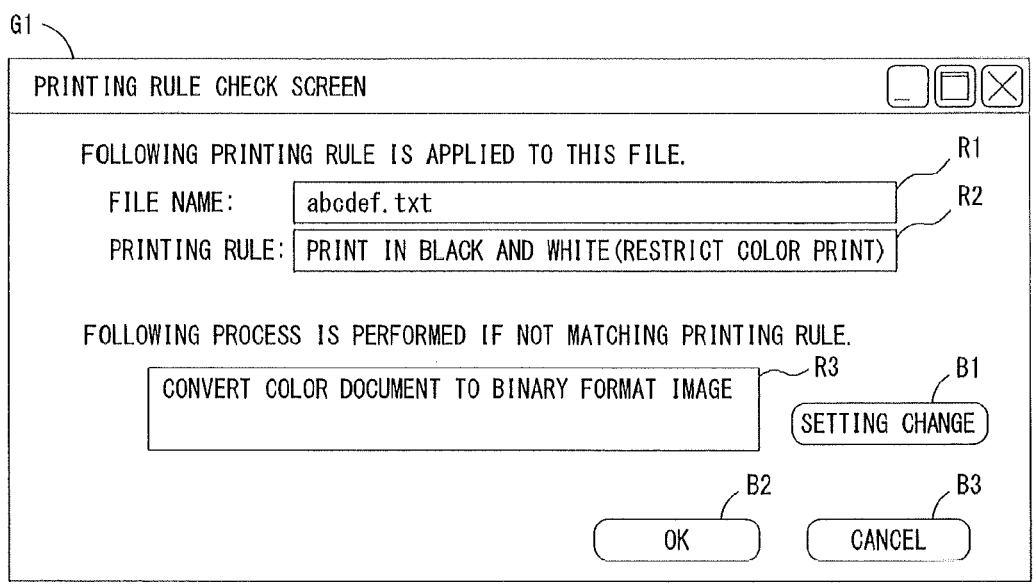
FIGS. 7A, 7B and 7C show an example of screens displayed on an information processing device.

Through process P3, the information processing device 2 displays a printing rule check screen G1 as illustrated in FIG. 7A on the display unit 21. The printing rule check screen G1 includes a file displaying region R1 and a rule displaying region R2. The file name of the file to print is shown in the rule displaying region R1, and the detail of the printing rule applied to the user of the information processing device 2 is shown in the rule displaying region R2. The user is allowed to check what printing rule is applied by viewing the printing rule check screen G1. The printing rule check screen G1 also includes a process detail region R3. For the print job not matching the printing rule shown in the rule displaying region R2, the detail of the setting change process performed with the print job is displayed in the process detail region R3. By checking the process detail region R3, the user is allowed to see the detail of the setting change process performed on the print job. Also, the user is allowed to determine whether or not the printed output is produced in a way the user desires with the setting change process. If the user determines that the printed output is not produced in a way the user desires with the setting change process, he or she presses a setting change button B1, thereby changing the setting change process performed on the print server 3. The user presses an OK button to establish the detail shown on the printing rule check screen G1. After the establish operation is detected on the information processing device 2, the update request is sent to the print server 3. A cancel button B3 is pressed to terminate the check operation along the way without establishing the detail shown on the printing rule check screen G1. After the cancellation operation is detected on the information processing device 2, the update request is not sent to the print server 3 and the process is complete.

Figure 7B:
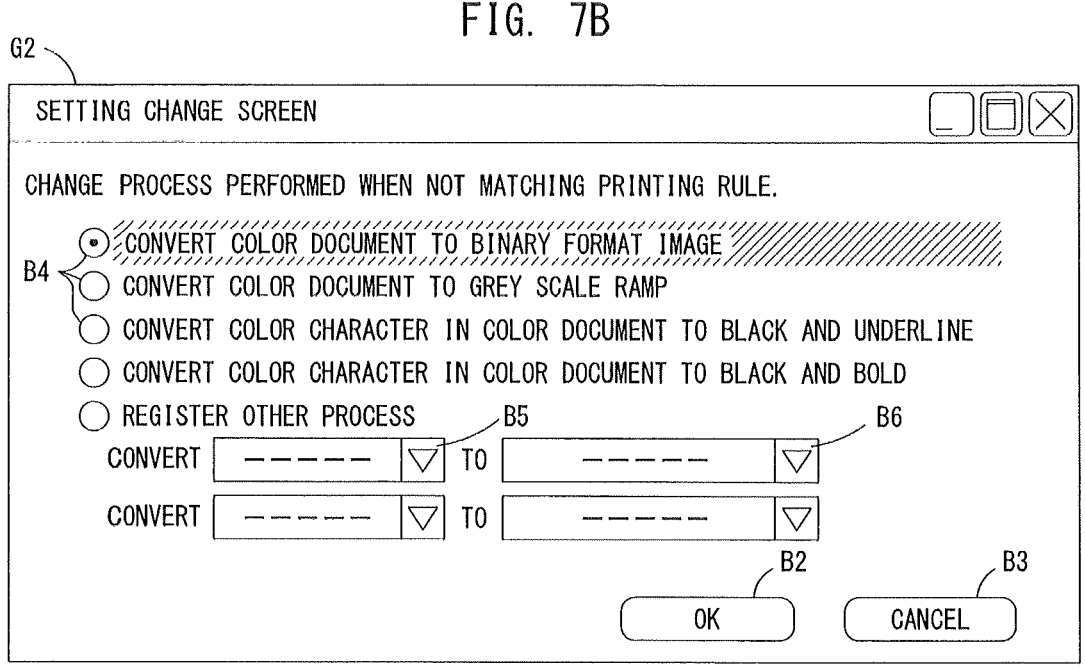

After detecting that the setting change button B1 is pressed by the user, the information processing device 2 displays a setting change screen G2 as illustrated in FIG. 7B on the display unit 21. On the setting change screen G2, the multiple setting change processes registered as the setting change registration information 7 are shown. Also, radio buttons B4 with which the user is allowed to select one of the multiple setting change processes as the user desires are shown on the screen. In the example of FIG. 7B, the setting change process to change the document in color to binary format image is selected. The user clicks one of the multiple radio buttons B4, thereby updating the setting change process to change the document in color to binary format image to another setting change process.

Figure 7C:
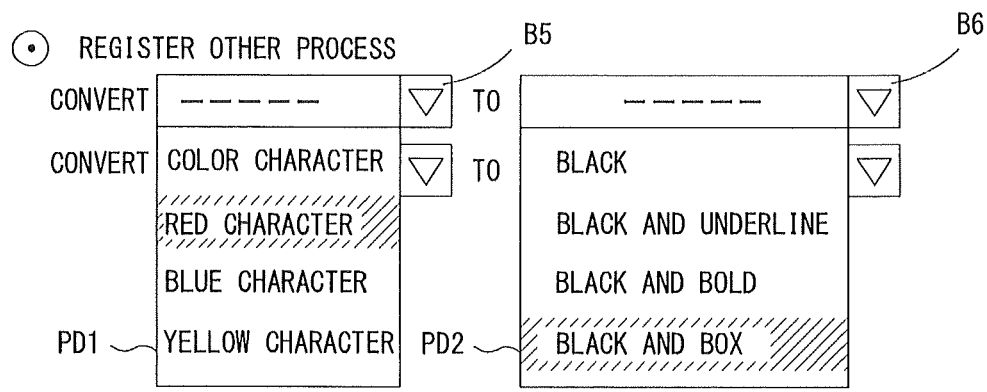

There is an item "register another process" of the multiple setting change processes shown on the setting change screen G2 at the most bottom. The item is selected when the user specifies the new setting change process. When selecting the item, the user is allowed to specify freely an item to change for converting the print setting of the print job and the setting change value for the item to change. According to the first preferred embodiment, the item "register another process" includes pull-down buttons B5 and B6. The user presses the pull-down buttons B5 and B6, thereby selecting freely the item to change and the setting change value for the item to change and specifying the new setting change process. To be more specific, for specifying the new setting change process, the user selects the radio button B4 corresponding to the item "register another process" and presses the pull-down buttons B5 and B6. Pull-down menus PD1 and PD2 are then shown as illustrated in FIG. 7C. The user selects the item to change and the setting change value as desires among from the items shown on the pull-down menus PD1 and PD2, and he or she is allowed to specify the desired setting change process. When selecting the item "register another process," the user is also allowed to specify more than one setting change process at the same time. In the examples of FIGS. 7B and 7C, the setting change process is specified with the pull-down menus. The process is not necessary to be input among from the processes shown in the pull-down menu form. The process may be input with a text input form, for instance.

The user may press the OK button B2 with specifying the desired setting change process on the setting change screen G2. In this case, the information processing device 2 determines whether or not the setting change process specified by the user is the new process. The user may press the OK button B2 with selecting the process other than the item "register another process." In this case, the setting change process matching the printing rule registered in advance with the setting change registration information 7 is specified. The information processing device 2, therefore, displays again the printing rule check screen G1 which shows the setting change process updated to the one specified by the user. When the cancel button B3 on the setting change screen G2 is pressed, the information processing device 2 displays again the printing rule check screen G1 without performing any specific process.

The user may press the OK button B2 with selecting the process other than the item "register another process." In this case, it is not determined that the process matches the printing rule. Thus, the information processing device 2 sends an inquiry at the print server 3. To be more specific, in response to detecting the setting change operation as the setting change screen G2 being displayed as illustrated in FIG. 6 (process P4), the information processing device 2 determines whether or not the setting change process is the new setting change process. When the new setting change process is specified, the information processing device 2 sends an inquiry D3 with user input information at the print server 3. As a result, the information processing device 2 requests for the determination to see if the new process specified by the user matches the printing rule to the print server 3. In response to receiving the inquiry D3 from the information processing device 2, the print server 3 refers to the determination information 8 and sends the inquiry at the administrator if necessary, thereby performing the determination process to see if the new process specified by the user matches the printing rule (process P5). The print server 3 then sends a determination result D4 to the information processing device 2.

Figure 8A:
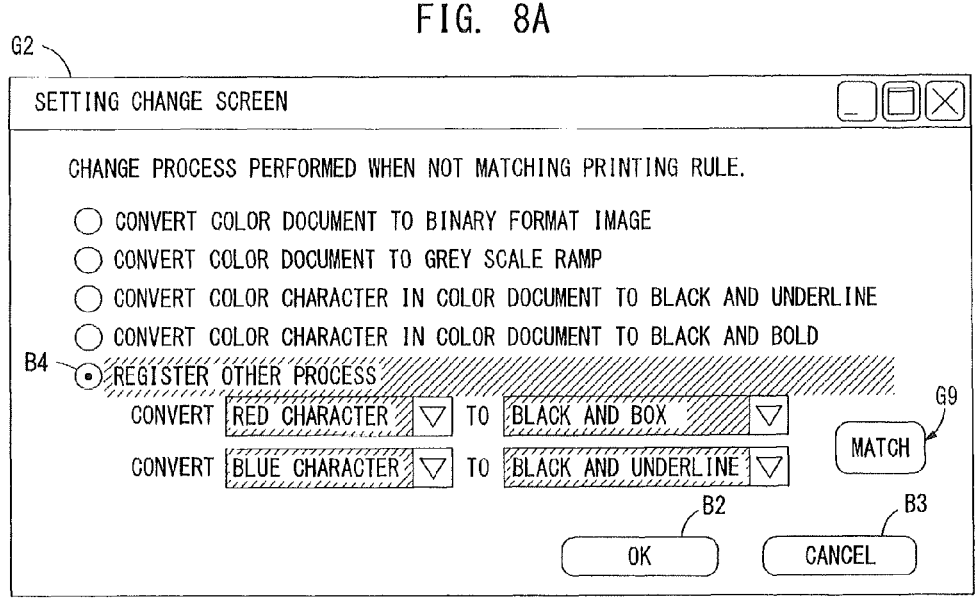
FIGS. 8A and 8B show an example of screens displayed on the information processing device.

After receiving the determination result D4 from the print server 3, the information processing device 2 updates the screen of the display unit 21 (process P6). FIG. 8A is an example of the setting change screen G2 displayed when the new setting change process specified by the user matches the printing rule. It is assumed, for example, when the printing rule to print in black and white is applied, the user specifies the setting change process to convert "red character" to "black and box" and "blue character" to "black and underline." In this case, the specified setting change process matches the printing rule, hence the determination result D4 received by the information processing device 2 from the print server 3 allows the setting change. The information processing device 2 displays an image G9 showing that the new setting change process matches the printing rule as illustrated in FIG. 8A based on the determination result D4. When the new setting change process does not match the printing rule, any image showing that the process does not match the printing rule is displayed.

Figure 8B:
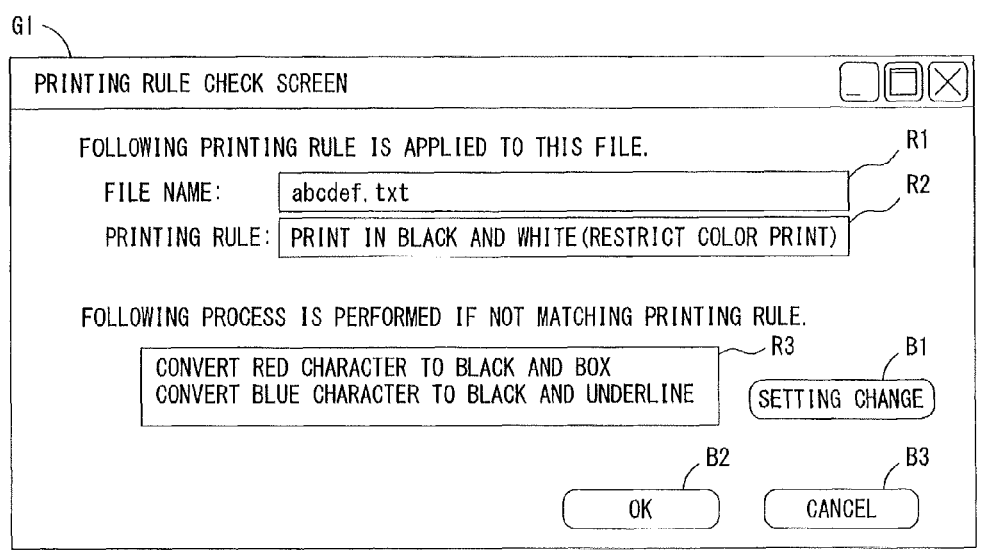

When the image G9 showing that the new process matches the printing rule is displayed, the OK button B2 on the setting change screen G2 may be pressed. After the OK button B2 is pressed by the user, the information processing device 2 displays again the printing rule check screen G1 which shows the setting change process updated to the new one specified by the user. FIG. 8B is an example of the printing rule check screen G1 showing the updated new setting change process. The printing rule check screen G1 of FIG. 8B includes the process detail region R3 in which the detail of the setting change process specified by the user is displayed. The setting change process performed on the print job not matching the printing rule is updated and displayed. The user presses the OK button B2 on the printing rule check screen G1, he or she is allowed to establish the detail shown on the printing rule check screen G1 of FIG. 8B.

Referring back to FIG. 6, after detecting the user operation to establish (process P7), the information processing device 2 sends an update request D5 containing the information relating to the setting change process specified by the user to the print server 3. In response to receiving the update request D5, the print server 3 updates the rule information 6 (process P8), and the setting change registration information 7 (process P9). If the setting change process specified by the user is new, the new process is additionally registered as the setting change registration information 7.

The information processing device 2 generates the print job JB1 and sends the generated print job JB1 to the print server 3 in response to the user instruction to print detected in process P1. After receiving the print job JB1 from the information processing device 2, the print server 3 changes the print setting of the print job JB1 within the range matching the printing rule, thereby converting the print job JB1 to the print job JB2 matching the printing rule (process P10). The setting change process specified by the user is performed on the print server 3. The print server 3 then outputs the print job JB2 matching the printing rule to the image forming device 5. After receiving the print job JB2 from the print server 3, the image forming device 5 produces the printed output based on the print job JB2 (process P11). The image forming device 5 produces the printed output which matches the printing rule and in a way the user intends. The printed output produced by the image forming device 5 is the one the user intends, hence the printed output does not go to waste.

Figure 9:
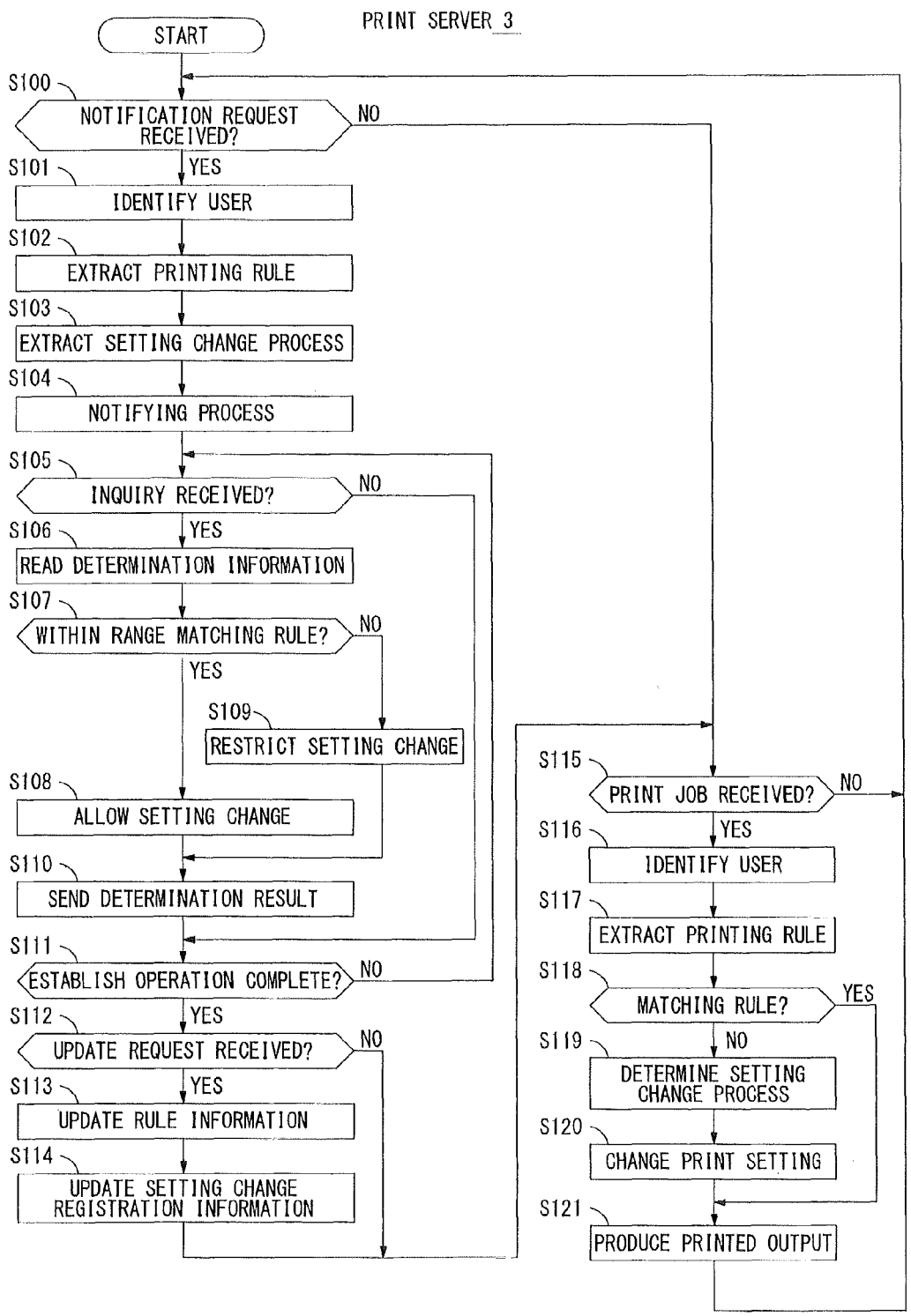
FIG. 9 is a flow diagram explaining an exemplary sequential procedure of the process performed on a print server.

FIG. 9 is a flow diagram explaining an exemplary sequential procedure of the process performed on the print server 3 realizing the printing system 1 as described above. This process is performed in response to startup of the aforementioned program 17 on the controller 10 of the print server 3.

Upon the start of this process, the print server 3 determines whether or not the printing rule notification request D1 is received over the network (step S100). Without any received notification request D1 (when a result of step S100 is NO), the print server 3 moves on to the process in step S115. With the received notification request D1 (when a result of step S100 is YES), the print server 3 identifies the user in response to the notification request D1 (step S101), and extracts the printing rule set for the identified user in the rule information 6 (step S102). The print server 3 extracts the multiple setting change processes registered in advance for the printing rule as options in the setting change registration information 7 (step S103). The print server 3 then notifies the information processing device 2 of the extracted information (step S104).

The print server 3 determines whether or not the inquiry D3 to ask if the setting change process matches the printing rule is received (step S105). In response to receiving the inquiry D3 from the information processing device 2 (when a result of step S105 is YES), the print server 3 reads the determination information 8 (step S106), and determines whether or not the setting change process specified by the information processing device 2 is within the range matching the printing rule (step S107). The print server 3 sends an inquiry at the administrator if necessary and determines based on the response from the administrator. As a result of the determination, the setting change process specified by the information processing device 2 may be within the range matching the printing rule (when a result of step S107 is YES). In this case, the print server 3 generates the determination result D4 allowing the setting change. The setting change process specified by the information processing device 2 may not be within the range matching the printing rule (when a result of step S107 is NO). In such a case, the print server 3 generates the determination result D4 restricting the setting change. The print server 3 then sends the generated determination result D4 to the information processing device 2 (step S110). If no inquiry D3 is received from the information processing device 2 in step S105, the print server 3 skips the process in steps S106 to S110.

The print server 3 determines if the check operation by the user of the information processing device 2 is complete (step S111). When the check operation by the user is not complete (when a result of step S111 is NO), the print server 3 returns to the process in step S105 to perform again the above-described process. In response to receiving a notification of completing the check operation by the user is received from the information processing device 2 (when a result of step S111 is YES), the print server 3 determines if the update request is received with the notification of completing the check operation (step S112). The update request thereby received is the one requesting the update of the setting change process registered as default with the rule information 6. The update request may be received (when a result of step S112 is YES). In this case, the print server 3 rewrites the default setting change process registered with the rule information 6 to the setting change process specified by the user and updates (step S113). Also, the print server 3 updates the setting change registration information 7 (step S114). Even when the check operation by the user is complete, the update request may not be received (when a result of step S112 is NO). In such a case, the print server 3 moves on to the process in step S115 without performing the process in steps S113 and S114.

In step S115, the print server 3 determines whether or not the print job JB1 is received over the network. When the print job JB1 is not received (when a result of step S115 is NO), the print server 3 returns to step S100 to perform again the above-described process. With the received print job JB1 (when a result of step S115 is YES), the print server 3 identifies the user who gave the print job JB1 (step S116), and extracts the printing rule set for the user in the rule information 6 (step S117). The print server 3 then determines if the received print job JB1 matches the printing rule based on the extracted printing rule (step S118). For the print job JB1 not matching the printing rule (when a result of step S118 is NO), the print server 3 specifies the setting change process to perform on the print job JB1 based on the default setting change process registered with the rule information 6 (step S119). The print server 3 performs the specified setting change process on the print job JB1, thereby changing the print setting of the print job JB1 and generating the print job JB2 (step S120). The print server 3 outputs the generated print job JB2 to the image forming device 5 (step S121). For the received print job JB1 matching the printing rule (when a result of step S118 is YES), the print server 3 outputs the received print job JB1 to the image forming device 5 without performing the process in steps S119 and S120. The print server 3 then returns to step S100 to repeat the above-described process.

Figure 10:
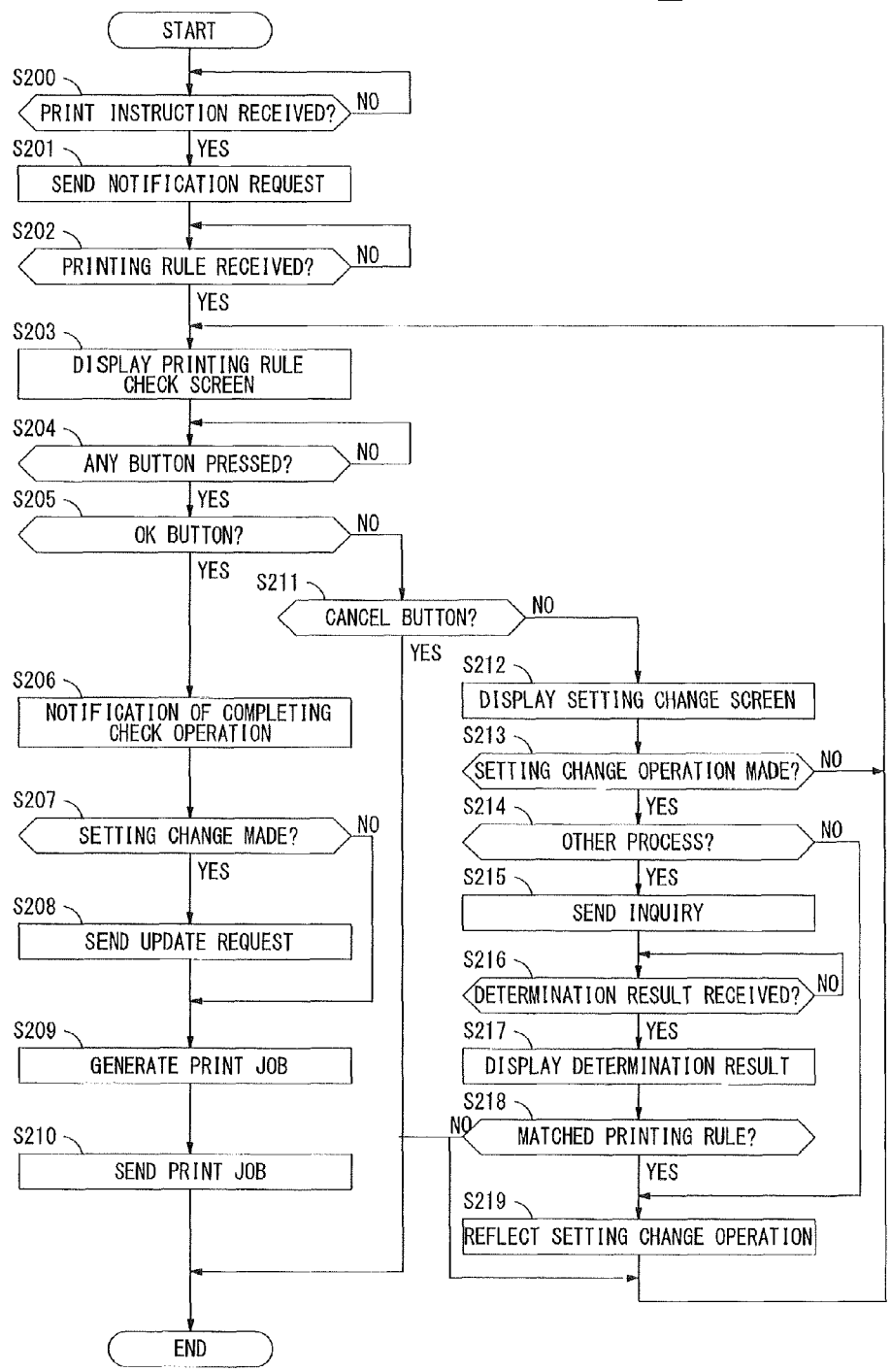
FIG. 10 is a flow diagram explaining an exemplary sequential procedure of the process performed on the information processing device.

FIG. 10 is a flow diagram explaining an exemplary sequential procedure of the process performed on the information processing device 2 realizing the printing system 1 as described above. This process is performed in response to startup of the aforementioned program 24 on the controller 20 of the information processing device 2.

Upon start of this process, the information processing device 2 is put into a standby state until receiving the user instruction to print (step S200). After detecting the user instruction to print (when a result of step S200 is YES), the information processing device 2 sends the printing rule notification request D1 to the print server 3 (step S201). In response to receiving the printing rule and the information relating to the printing rule from the print server 3 (when a result of step S202 is YES), the information processing device 2 displays the aforementioned printing rule check screen G1 based on the received information (step S203). The information processing device 2 is put again into a standby state until detecting the press operation of the button by the user (step S204). After detecting the press operation of the button by the user (when a result of step S204 is YES), the information processing device 2 determines whether or not the OK button B2 on the printing rule check screen G1 is pressed (step S205).

When the OK button B2 on the printing rule check screen G1 is pressed by the user (when a result of step S205 is YES), the information processing device 2 sends the notification of completing the check operation to notify the user operation to establish to the print server 3 (step S206), and determines whether or not the operation to change the setting change process is made by the user (step S207). When the user has performed the operation to change the setting change process until then (when a result of step S207 is YES), the information processing device 2 sends the update request D5 containing the information relating to the setting change process specified by the user to the print server 3 (step S208). After that, the information processing device 2 generates the print job JB1 (step S209) and sends the generated print job JB1 to the print sever 3, thereby completing the whole process (step S210).

The user may press the cancel button B3 (when a result of step S211 is YES) instead of the OK button B2 (when a result of step S205 is NO) as the printing rule check screen G1 is displayed. In this case, the information processing device 2 completes the whole process without performing any specific process.

The user may press the setting change button B1 (when a result of step S211 is NO) as the printing rule check screen G1 is displayed. In this case, the information processing device 2 displays the aforementioned setting change screen G2 based on the information received from the print server 3 (step S212). The information processing device 2 may detect the user operation as displaying the setting change screen G2. In this case, the information processing device 2 determines whether or not the operation is to change the setting change process performed at job conversion (step S213). When the operation is to change the setting change process (when a result of step S213 is YES), the information processing device 2 determines the setting change process specified by the user is the one registered in advance as the setting change registration information 7 or the one newly registered by the user (step S214). If it is the other process which is new (when a result of step S214 is YES), the information processing device 2 sends the inquiry D3 at the print server 3 (step S215), and is put into the standby state until receiving the determination result D4 from the print server 3 (step S216). In response to receiving the determination result D4 (when a result of step S216 is YES), the information processing device 2 displays the determination result D4 on the setting change screen G2 (step S217), and determines with the determination result D4 if the new process specified by the user is within the range matching the printing rule (step S218). For the process matching the printing rule (when a result of step S218 is YES), the information processing device 2 updates the screen showing the setting change process specified by the user (step S219). The setting change process specified by the user may be the one registered in advance as the setting change registration information 7 (when a result of step S214 is NO). In also this case, the information processing device 2 updates the screen showing the setting change process specified by the user (step S219). The process specified by the user may be new and the new process may not match the printing rule (when a result of step S218 is NO). In this case, the information processing device 2 does not update the screen to show the setting change process specified by the user. The information processing device 2 then returns to step S203 to perform the above-described process with displaying the printing rule check screen G1 in response to user operation. When the setting change operation is made as the setting change screen G2 being displayed, the update request D5 containing the information relating to the setting change process specified by the user is sent to the print server 3 in later step S208. After the print job JB1 generated in step S209 is sent to the print server 3 in step S210, the setting change process specified with the update request D5 is performed on the print server 3 and the print job JB2 to produce the printed output in a way the user intends within the range matching the printing rule can be generated.

For generating the print job JB1 in step S209, the information processing device 2 may generate the print job matching the printing rule based on the setting change process specified by the user. In such a case, the print job JB1 sent to the print server 3 in step S210 matches the printing rule, and it is not necessary to perform the process to change the print setting on the print server 3. As a result, the process load on the print server 3 to which many print jobs centralized may be reduced.

Figure 11A:
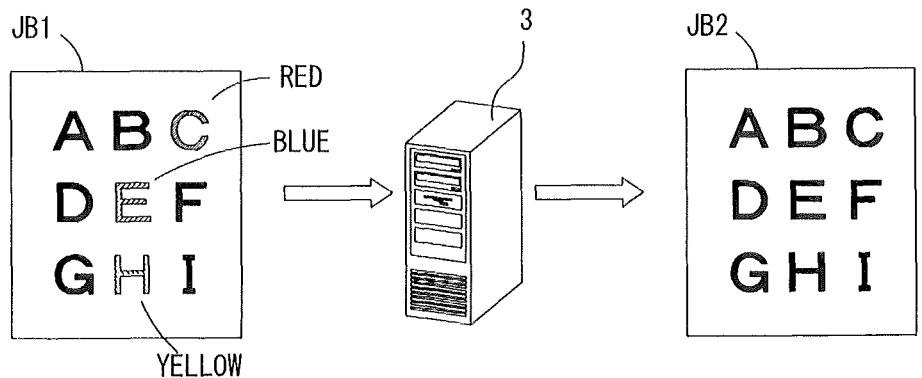
FIGS. 11A, 11B and 11C show an example of a setting change process performed within a range of a printing rule to produce a printed output in black and white.
Figure 11B:
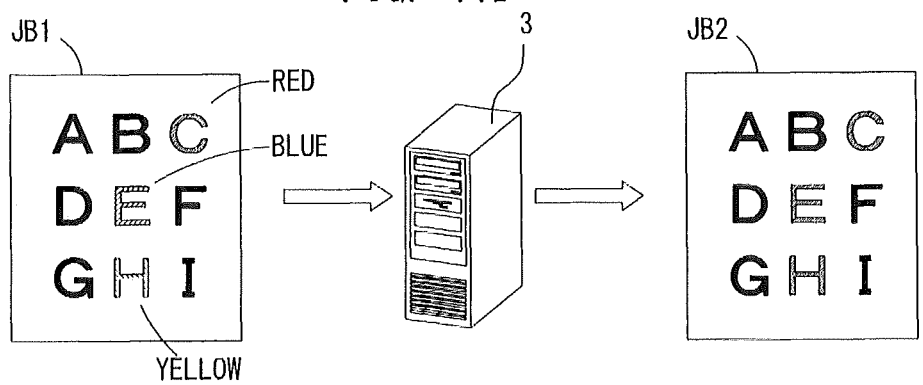
Figure 11C:
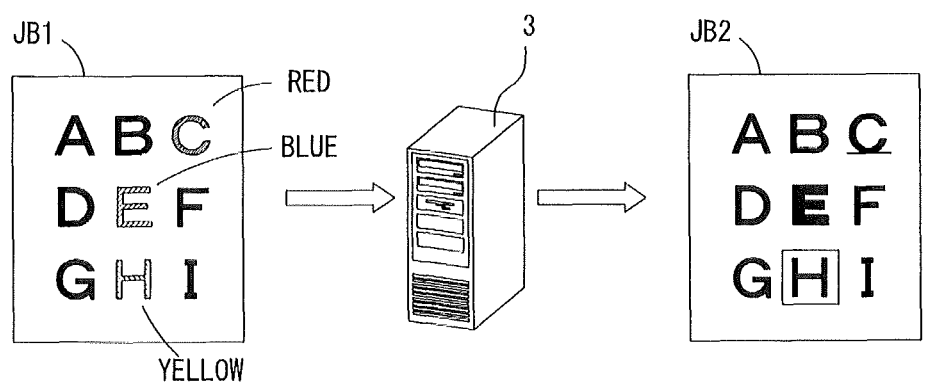

The various types of printings performed within the range of the printing rule based on the setting change process specified by the user are described next. FIGS. 11A, 11B and 11C show an example of the setting change process performed within the range of the printing rule to produce the printed output in black and white. In the example of FIGS. 11A, 11B and 11C, the print job JB1 input to the print server 3 is the one to print the color document in color, and the color document in the print job JB1 contains the red character, the blue character and the yellow character.

FIG. 11A shows an example of the process to convert the color document to binary format image, which is the default setting change process registered with the rule information 6. For performing the process to convert the color document to binary format image on the print server 3, each of the red character, the blue character and the yellow character contained in the color document is converted to black as illustrated in FIG. 11A. Thus, the print job JB2 is the job to print all the characters contained in the document in black. In this case, the produced printed output based on the print job JB2 does not allow the user to distinguish the red character, the blue character and the yellow character contained in the original color document with other black characters.

FIG. 11B shows an example of the process to convert the color document to a grey scale ramp as the setting change process of the print setting. For performing the process to convert the color document to grey scale ramp on the print server 3, each of the red character, the blue character and the yellow character contained in the color document is converted to grey scale ramp (middle tone value) as illustrated in FIG. 11B. Thus, the print job JB2 is the job to print all the characters contained in the document in black or grey. In this case, all the colored characters including the red character, the blue character and the yellow character contained in the original document are printed in grey on the produced printed output based on the print job JB2 so that the user is allowed to find the colored character on the printed output. The user, however, is not allowed to find each of the red character, the blue character and the yellow character on the original colored document by seeing the printed output.

FIG. 11C shows an example of the process to convert the red character to "black character and underline," the blue character to "black character and bold font" and the yellow character to "black character and box" as the setting change process of the print setting. For performing the above-described setting change process on the print server 3, the red character contained in the color document is converted to black character and underlined. The blue character is converted to black character and the character is made bold. The yellow character is converted to black character and put a box. Thus, the print job JB2 is the job to print all the characters contained in the document in black. However, the job is capable of allowing the user to identify separately each of the red, yellow and blue characters contained in the original color document by highlighting them. The user, therefore, is allowed to find each of the red character, the blue character and the yellow character contained in the original colored document by seeing the printed output produced through printing based on the print job JB2.

It is assumed, for example, the user would like to create the color document which contains the characters in multiple colors with the document edit application, and produces the printed output which distinguishes the characters in each color contained in the color document. In such a case, the user may configure the highlight on the characters in each color differently and register the setting change process. As a result, the printed output as illustrated in FIG. 11B is produced. The user is allowed to have the printed output that distinguishes the characters in each color as the user intends within the range matching the printing rule.

Figure 12A:
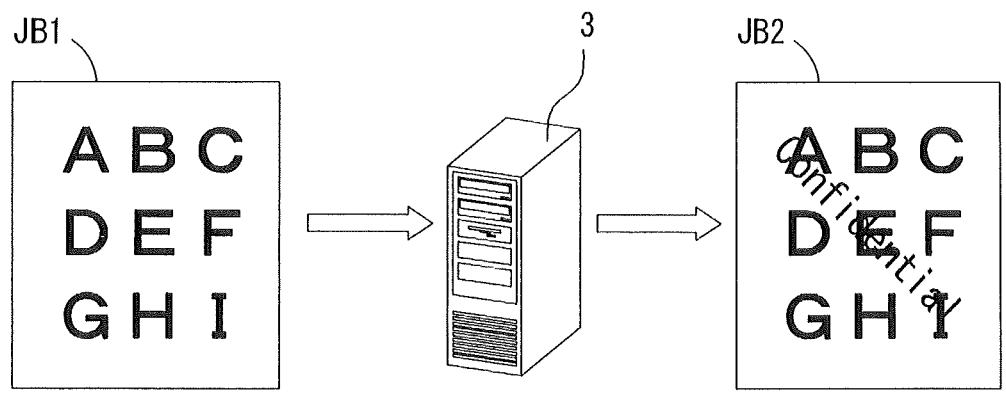
FIGS. 12A and 12B show an example of the setting change process performed within the range of the printing rule to produce the printed output after adding the watermark.
Figure 12B:
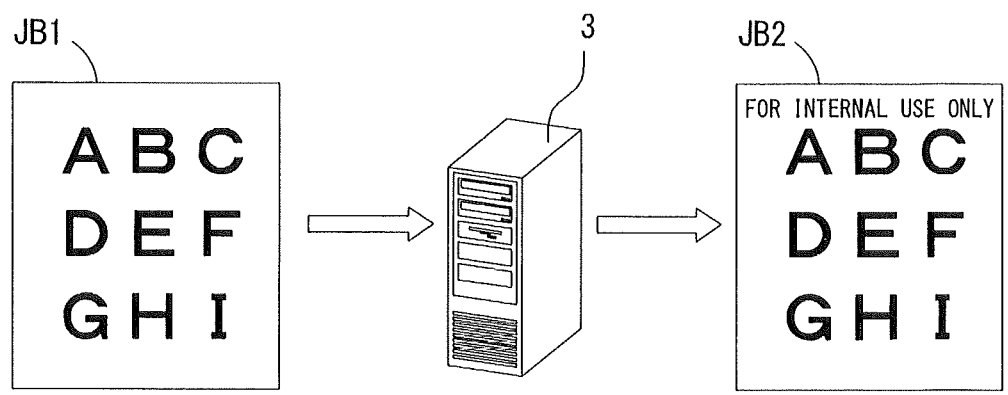

FIGS. 12A and 12B show an example of the setting change process performed within the range of the printing rule to produce the printed output after adding the watermark. In the example of FIGS. 12A and 12B, the print job JB1 input to the print server 3 is the one to print without adding the watermark.

FIG. 12A shows an example of the process to add "Confidential" in the center of the document in yellow at an angle of 45 degree of rotation, which is the default setting change process registered with the rule information 6. For performing this setting change process on the print server 3, the yellow character string image "Confidential" is added as the watermark in the center of the original document at an angle of 45 degree of rotation as illustrated in FIG. 12A. In this case, the characters contained in the original document and the watermark are printed on top of each other. Thus, the printed output produced based on the print job JB2 makes difficult for the user to read the characters contained in the original document, and may not be the one the user intends.

FIG. 12B shows an example of the process to add a black character string image "FOR INTERNAL USE ONLY" in the margin of the document as the watermark at an angle of 0 degree of rotation as the setting change process for print setting. For performing this setting change process on the print server 3, the black character string image "FOR INTERNAL USE ONLY" is horizontally added as the watermark in the margin such as the header of the original document, for instance, as illustrated in FIG. 12B. In this case, the characters contained in the original document and the watermark are not printed on top of each other so that the user is easier to read the characters in the original document. When the user would like to produce the printed output in a way easier for him or her to read the characters in the original document, for example, he or she specifies this setting change process. The user does not have to always specify this process. The user may specify to add the intended character string image as the watermark, to add the watermark at the intended position or adjust the color or the level of transparent mark. As a result, even when the printing rule to print after adding the watermark is applied, the printed output as the user intends may be produced.

It is the same for the printing rule to print two pages on a single sheet, and with the default setting change process registered with the rule information 6, the printed output may not be produced as the user intends. In this case, the user needs to specify the setting change process with which the intended printed output may be produced within the range of the printing rule. The user sets in advance the order of the pages for printing multiple pages on a single sheet, thereby having the printed output arranged in the intended page order.

The setting change process performed at the conversion of the print job JB1 that does not match the printing rule to the print job JB2 that matches the printing rule on the print server 3 may be registered. As described above, the printing system 1 of the first preferred embodiment allows the user to change the aforementioned setting change process to the different one within the range matching the printing rule by operating the information processing device 2. The user is not bothered for configuring the print setting to match the printing rule separately for each document as running the document edit application on the information processing device 2. It is assumed that the characters in multiple colors are contained in the color document, and the printing rule to print in black and white is applied to the color document. Even in such a case, it is not necessary for the user to configure in advance by manual the highlight setting on each character in the respective colors with the document edit application. The user only needs to specify the setting change process performed on the print server 3. Thus, the printing system 1 of the first preferred embodiment converts the print job JB1 not matching the printing rule to the print job JB2 matching the printing rule forcibly. However, the printing system 1 is capable of producing the printed output as the user intends without placing a heavy operation burden on the user.

As described above, for applying the printing rule and producing the printed output, production of the printed output not intended by the user may be prevented.

Second Preferred Embodiment

The second preferred embodiment of the present invention is described next. According to the above-described first preferred embodiment, after receiving the print job JB1 from the information processing device 2 over the network, the print server 3 applies the printing rule to the received print job JB1.

In the second preferred embodiment, the print job JB1 has already been stored on the print server 3, and when the user uses the image forming device 5 to specify pull printing of the print job JB1 stored on the print server 3, the printing rule is applied.

Figure 13:
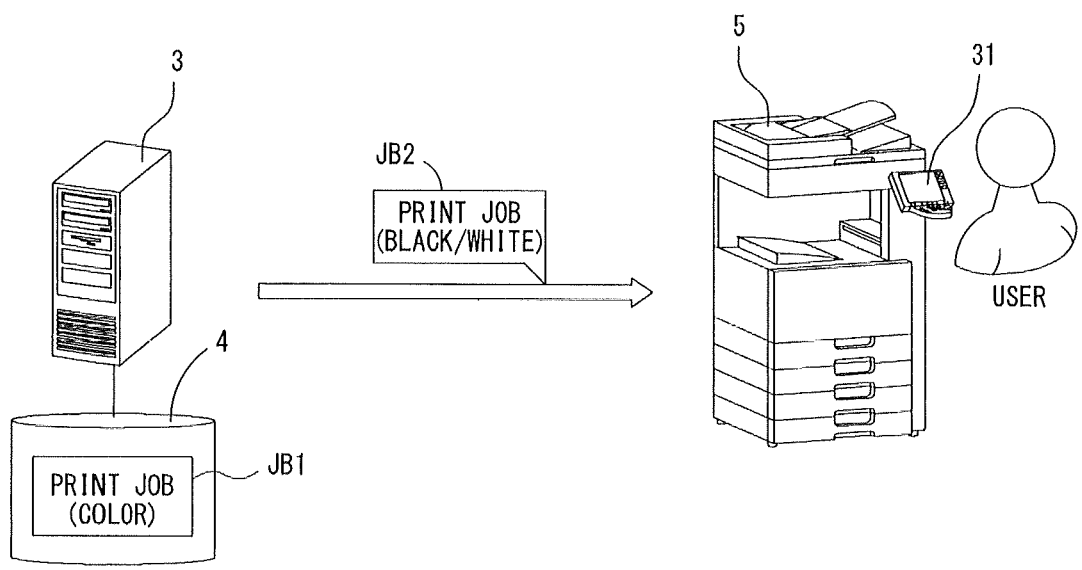
FIG. 13 shows an exemplary configuration of the printing system of a second present preferred embodiment.

FIG. 13 shows an exemplary configuration of the printing system 1 of the second preferred embodiment. The information including the rule information 6 set by the administrator is stored in advance in the print server 3, which is the same as in the first preferred embodiment. According to the second preferred embodiment, the print job JB1 is stored in advance in the storage device 4 of the print server 3 as illustrated in FIG. 13. As well as the first preferred embodiment, the print job JB1 is sent from the information processing device 2 to the print server 3 and is stored in the print server 3 in response to user instruction given through the information processing device 2, for example.

The user who would like to have the printed output produced based on the print job JB1 stored in the print server 3 may move to the installation site of the image forming device 5 and operates an operational panel 31 provided at the front part of the image forming device 5 to log into the print server 3. In response to log-in, a list of the print job based on which the user is allowed to specify printing of the print jobs stored in the print server 3 is displayed on a screen of the operational panel 31. The user selects the print job JB1 for printing in color, for instance, among from the print jobs JB1 in the list and gives the instruction to pull print. As a result the image forming device 5 acquires the print job from the print server 3 and produces the printed output.

The print server 3 sends the print job JB1 specified by the user to the image forming device 5 in response to a job request from the image forming device 5. In this case, on the printing system 1 of the second preferred embodiment, it is determined whether or not the print job JB1 to send to the image forming device 5 matches the printing rule set by the user. For the job matching the printing rule, the print server 3 outputs the print job JB1 stored in the storage device 4 as it is to the image forming device 5. For the job not matching the printing rule, the print server 3 changes the print setting of the print job JB1 stored in the storage device 4 and converts to the print job JB2 matching the printing rule, thereby outputting to the image forming device 5, which is the same as the first preferred embodiment.

The printing system 1 of the second preferred embodiment is configured to display the printing rule applied to the user and the information relating to the printing rule on the screen of the operational panel 31 when the user operates the operational panel 31 of the image forming device 5 and logs into the print server 3. Also, based on the setting change operation by the user, the setting change process performed at job conversion is allowed to be changed to the process desired by the user within the range matching the printing rule.

Figure 14:
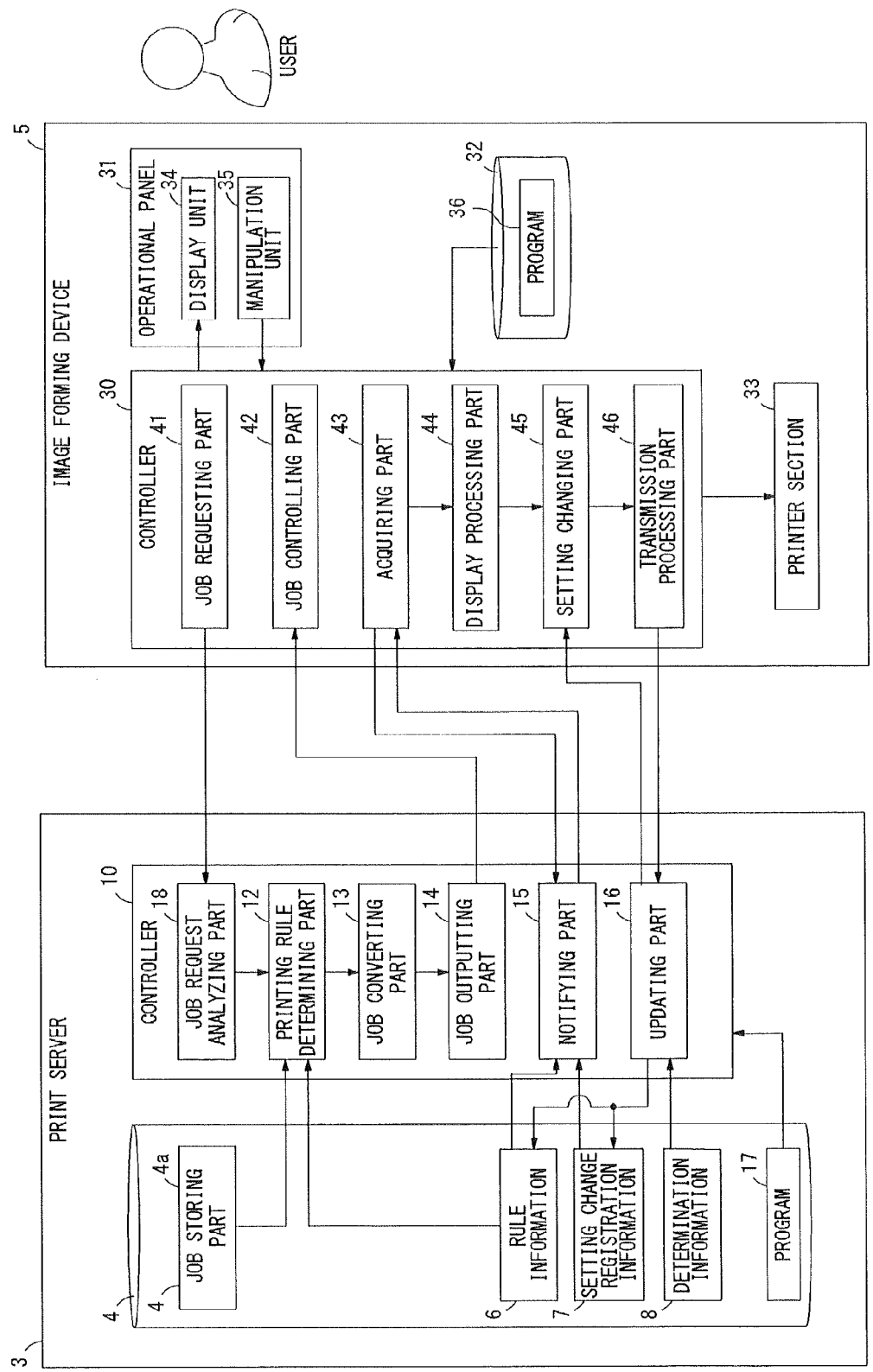
FIG. 14 is a block diagram showing an exemplary hardware configuration and functional configuration of the printing system of the second preferred embodiment.

FIG. 14 is a block diagram showing an exemplary hardware configuration and functional configuration of the printing system 1 of the second preferred embodiment. The controller 10 of the print server 3 of the second preferred embodiment executes the program 17, thereby serving as a job request analyzing part 18, the printing rule determining part 12, the job converting part 13, the job outputting part 14, the notifying part 15 and the updating part 16. The printing rule determining part 12, the job converting part 13, the job outputting part 14, the notifying part 15 and the updating part 16 are the same as those described in the first preferred embodiment. The job request analyzing part 18 analyzes the job request received from the image forming device 5 and designates the print job JB1 specified by the user as the target of output.

The image forming device 5 includes a controller 30, a storage device 32 and a printer section 33 besides the above-described operational panel 31. The controller 30 includes a CPU and a memory. The storage device 32 formed from a device such as a hard disk device. The printer section 33 forms images on a sheet such as a printing sheet and produces the printed output. The operational panel 31 includes a display unit 34 formed from a device such as a liquid crystal display, for example, and the manipulation unit 35 receiving the user instructions as illustrated in FIG. 14. The storage device 32 stores therein a program 36 installed in advance, and the program 36 is executed by the CPU of the controller 30. The CPU of the controller 30 reads and executes the program 36, and the controller 30 serves as a job requesting part 41, a job controlling part 42, an acquiring part 43, a display processing part 44, a setting changing part 45 and a transmission processing part 46. The acquiring part 43, the display processing part 44, the setting changing part 45 and the transmission processing part 46 of the aforementioned processing parts have the same features as the respective acquiring part 26, display processing part 27, setting changing part 28 and transmission processing part 29 of the information processing device 2 of the first preferred embodiment. The job requesting part 41 sends the job request to the print server 3 in response to user operation detected by the manipulation unit 35. The job controlling part 42 receives the print job JB1 from the job outputting part 14 of the print server 3 and controls the operation for printing by driving the printer section 33 based on the received print job JB1.

On the printing system 1 of the second preferred embodiment, each of the print server 3 and the image forming device 5 has the above-described configuration so that the printing rule applied to the user and the information relating to the printing rule is allowed to be displayed on the display unit 34 of the operational panel 31 when the user specifies pull printing through the operational panel 31, which is the same as the first preferred embodiment. Also, based on the setting change operation by the user, the setting change process performed at job conversion is allowed to be changed to the process desired by the user within the range matching the printing rule.

Figure 15:
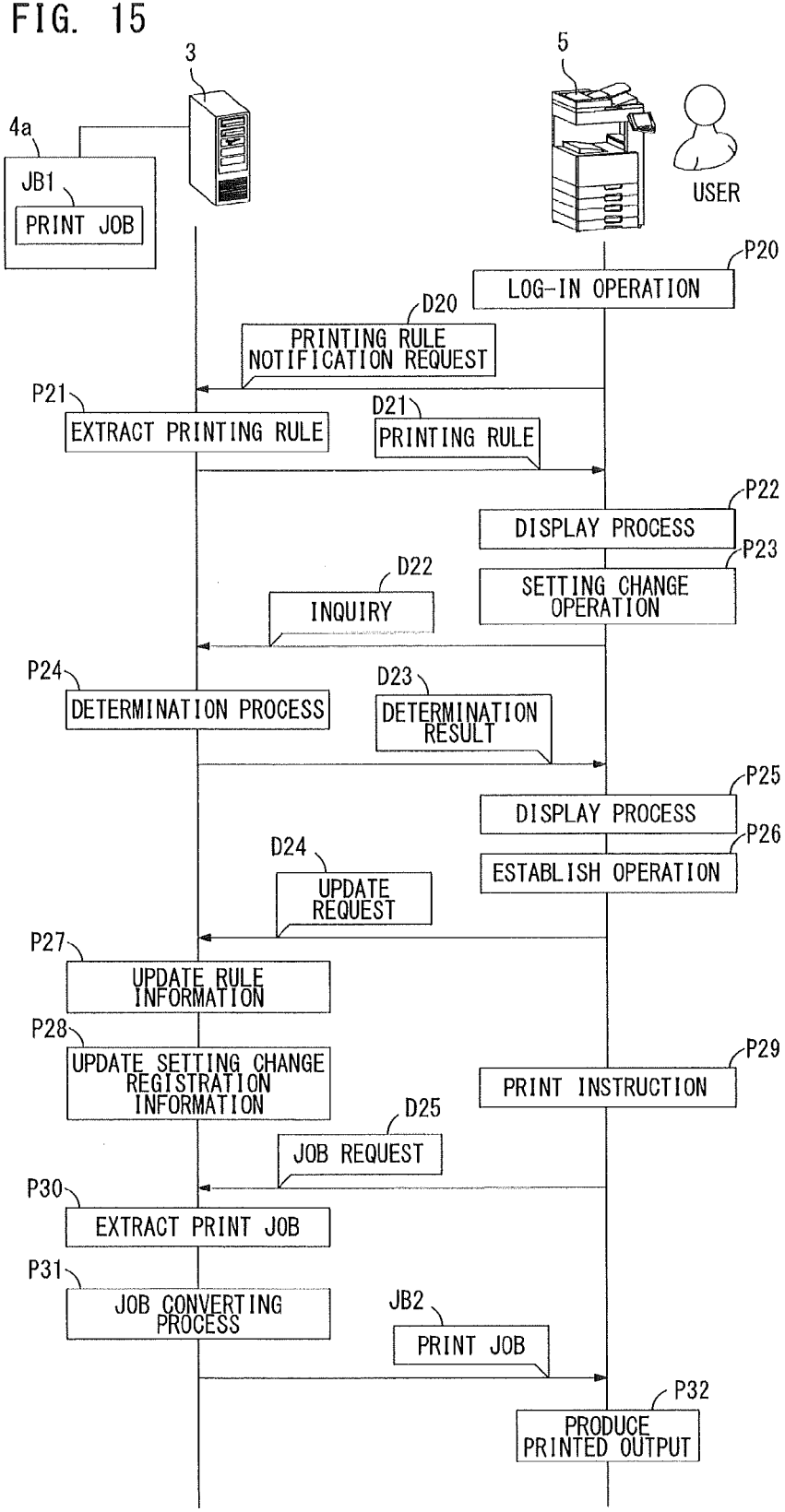
FIG. 15 shows concepts of the process flow performed by each device on the printing system of the second preferred embodiment.

FIG. 15 is the exemplary sequence diagram of the process performed by each device, the image forming device 5 and the print server 3 on the printing system 1 of the second preferred embodiment. As shown in FIG. 15, when the user operation to log-in is detected on the image forming device 5 (process P20), the printing rule notification request D20 is sent to the print server 3 from the image forming device 5. The print server 3 allows the log-in when the user using the image forming device 5 is one of registered users, and extracts the printing rule D21 set for the user of the image forming device 5 in response to the notification request D20 received from the image forming device 5 (process P21). The print server 3 sends the extracted printing rule D21 to the image forming device 5. The printing rule D21 thereby sent to the image forming device 5 from the print server 3 includes not only the printing rule corresponding to the user but also the information relating to the printing rule the same as the first preferred embodiment. In response to receiving the printing rule D21 from the print server 3, the image forming device 5 performs the display process based on the received printing rule D21 (process P22). In the display process, the image forming device 5 displays the screen as well as the above-described printing rule check screen G1 on the display unit 34. As a result, the user is allowed to check in advance what printing rule is applied by viewing the screen of the operational panel 31. The image forming device 5 is also capable of displaying the screen as well as the above-described setting change screen G2 on the display unit 34 in response to user operation. The user, therefore, is allowed to change the setting change process performed on the print server 3 by operating the screen on the operational panel 31 in the way described in the first preferred embodiment.

In response to detecting the operation to change the setting change process performed on the print server 3 to the different one (process P23), the image forming device 5 determines whether or not the setting change process specified by the user is new which is not registered as the setting change registration information 7. The setting change process specified by the user may be the new one. In this case, the image forming device 5 sends an inquiry D22 at the print server 3. After receiving the inquiry D22 from the image forming device 5, the print server 3 refers to the determination information 8 and sends an inquiry at the administrator as required, thereby determining whether or not the new process specified by the user matches the printing rule (process P24). The print server 3 then sends a determination result D23 to the image forming device 5.

After receiving the determination result D23 from the print server 3, the image forming device 5 updates the screen on the operational panel 31 (process P25). In response to detecting the user operation to establish (process P26), the image forming device 5 sends to the print server 3 an update request D24 containing the information relating to the setting change process specified by the user. After receiving the update request D24, the print server 3 updates the rule information 6 (process P27) and the setting change registration information 7 (process P28). The setting change process specified by the user may be the new process. In such a case, the new process is additionally registered with the setting change registration information 7.

After detecting the user instruction to print (process P29), the image forming device 5 sends a job request D25 to the print server 3. In response to receiving the job request D25, the print server 3 extracts the print job JB1 specified by the user in the job storing part 4a (process P30), and changes the print setting of the print job JB1 within the range matching the printing rule, thereby converting the print job to the print job JB2 matching the printing rule (process P31). The setting change process specified by the user is performed on the print server 3. The print server 3 outputs the print job JB2 matching the printing rule to the image forming device 5. After receiving the print job JB2 from the print server 3, the image forming device 5 produces the printed output based on the received print job JB2 (process P32). The image forming device 5 produces the printed output which matches the printing rule and in a way the user intends. The printed output to be produced by the image forming device 5 is the one intended by the user, hence the printed output does not go to waste.

The sequence of the process described in FIG. 9 of the first preferred embodiment may be applied to the sequence of the process performed by the print server 3 of the second preferred embodiment. In this case, the print server 3 may determine whether or not the job request is received in step S115 of FIG. 9, and read the print job in the job storing part 4a in the storage device 4 if the job request is received.

The sequence of the process described in FIG. 10 of the first preferred embodiment may be applied to the sequence of the process performed by the image forming device 5 of the second preferred embodiment. In this case, the image forming device 5 may determine whether or not the user operation to log-in is detected in step S200 of FIG. 10, and send the job request to the print server 3 if the user instruction to print is detected in step S209. In step S210, the image forming device 5 may produce the printed output based on the print job received from the print server 3.

The image forming device 5 acquires the print job JB1 to pull print from the print server 3 before the setting change operation is performed by the user. When the setting change operation is performed by the user, the image forming device 5 may convert the print job JB1 previously received with the internal process on the image forming device 5 based on the setting change process specified by the user, thereby generating the print job JB2 matching the printing rule. In this case, it is not necessary to perform the process to change the print setting on the print server 3 so that the process load on the print server 3 to which many print jobs centralized may be reduced.

As described above, the printing system 1 of the second preferred embodiment is configured to change the setting change process performed on the print server 3 to the different process within the range matching the printing rule when the user uses the image forming device 5 to specify pull-printing based on the print job JB1 stored on the print server 3. Thus, also on the printing system 1 of the second preferred embodiment, it is controlled to make the printed output produce in the way matching the printing rule set in advance and in the way as intended by the user.

Modifications

While the preferred embodiments of the present invention have been described above, the present invention is not limited to the preferred embodiments. Various modifications may be applied to the present invention.

The various types of the printing rule besides the aforementioned printing rules may be introduced as the printing rule registered in advance with the print server 3, for example. As an example, the printing rule to convert a print format (data format) of the print job to data in a certain format such as PDF (Portable Document Format) on the print server 3 and output the data may be introduced. Even when the printing rule to convert to PDF data and output the data, for instance, is introduced, there are multiple processes as the setting change process performed within the range matching the printing rule. To be more specific, as the first process, there is the process to convert to the normal PDF data and output, and there is the process to convert to the compact PDF data and output as the second process. As the third process, there is the process to convert to the searchable PDF data and output, and as the fourth process, there is the process to convert to the encrypted PDF data and output. Even when the printing rule to convert to the PDF data and output is applied, the user is allowed to specify the desired setting change process depending on the use among from the aforementioned the first to the fourth processes matching the printing rule.

As described above, the printing rule registered with the rule information 6 is set for the user or the group. The printing rule is not always set for the user or the group. The printing rule may be set for a file to print, for instance. In this case, the printing rule may be set for the file name or the type of the file (for example, extension).

The image forming device 5 of the above-described preferred embodiments is shown to be one of MFPs. The image forming device 5 is not necessarily the device such as the MFPs. To be more specific, the image forming device 5 should include at least printing function. The image forming device 5 may be a printer.

The print server 3 of the above-described preferred embodiments is shown to be a server, for example. The print server 3 is not necessarily the device such as the server. To be more specific, the functions on the print server 3 as described above may be included as a part of functions on other devices (for instance, the information processing device 2 or the image forming device 5).

What is claimed is:

1. A printing system comprising an information processing device, a print server and an image forming device, said print server receiving a print job having an original print setting sent from said information processing device and the print job received by said print server being output to said image forming device so that printing process is performed, wherein
said print server includes:
a storage configured to store a printing rule defining an output condition for printing, and a plurality of setting change processes associated within a range matching said printing rules, said plurality of setting change processes including a default setting change process and at least one different setting change process; and
a first processor configured to:
notify said information processing device of said printing rule and said plurality of setting change processes in response to receiving a notification request from said information processing device; and
forcibly change the original print setting of the print job based on a setting change process selected by the user in response to receiving the print job from said information processing device, thereby converting the print job to a print job matching said printing rule, and
said information processing device includes:
a second processor configured to:
acquire said printing rule and information relating to said plurality of setting change processes by sending the notification request to said print server;
display said printing rule and details of said setting change processes based on the information acquired by said second processor;
change said setting change process performed by said first processor from said default setting change process to a different setting change process in response to the user operation to select as the information is being displayed on a display; and
send said different setting change process selected by the user to said print server.

2. The printing system according to claim 1, wherein
said first processor further configured to update said setting change processes applied when said first processor changes the print setting based on said setting change process received from said information processing device.

3. The printing system according to claim 2, wherein
said first processor further configured to change the print setting of the print job based on said setting change process selected in advance as the default among from said multiple setting change processes,
said first processor further configured to send the information relating to said multiple setting change processes to said information processing device for notifying said information processing device of said setting change process, and
said first processor further configured to change said default setting change process applied when said first processor changes the print setting based on said setting change process selected among from said multiple setting change processes, said setting change process being received from said information processing device.

4. The printing system according to claim 2, wherein
said first processor further configured to store in the storage determination information to determine whether or not said setting change process is within the range matching said printing rule, and
said first processor further configured to determine whether or not said setting change process received from said image forming device matches said printing rule based on said determination information, and updates said setting change process applied when said first processor changes the print setting based on said selected setting change process if determining that said setting change process matches said printing rule.

5. The printing system according to claim 1, wherein
said second processor further configured to generate the print job matching said printing rule based on said setting change process changed by said first processor and sending the generated print job to said print server.

6. The printing system according to claim 1, wherein
the first processor is further configured to store a plurality of printing rules, and each of the printing rules is associated with a particular user of a particular group of users.

7. A printing system comprising a print server and an image forming device, a print job being stored in said print server and having an original print setting, said print server outputting the print job to said image forming device in response to a request from said image forming device so that printing process is performed, wherein
said print server includes:
part a first storage for storing the print job;
a second storage for storing a printing rule defining an output condition for printing, and a plurality of setting change processes associated within a range matching said printing rules, said plurality of setting change processes including a default setting change process and at least one different setting change process; and
a first processor configured to:
notify said image forming device of said printing rule and said plurality of setting change processes in response to receiving a notification request from said image forming device; and
forcibly change said original print setting of the print job based on a setting change process selected by the user in response to receiving a request for sending the print job stored in said first storage from said image forming device, thereby converting the print job to a print job matching said printing rule, and
said image forming device includes:
a display; and
a second processor configured to:
acquire said printing rule and information relating to said plurality of setting change processes by sending the notification request to said print server;
display said printing rule and details of said plurality of setting change processes based on the information acquired by said second processor;
change said setting change process performed by said first processor from said default setting change process to a different process in response to the user operation to select as the information is being displayed on said display; and
send said different setting change process selected by the user to said print server.

8. The printing system according to claim 7, wherein
said first processor further configured to update said setting change process applied when said first processor changes the print setting based on said setting change processes received from said image forming device.

9. The printing system according to claim 8, wherein
said first processor further configured to change the print setting of the print job based on said setting change process selected in advance as the default among from said multiple setting change processes,
said first processor further configured to send the information relating to said multiple setting change processes to said image forming device for notifying said image forming device of said setting change process, and
said first processor further configured to change said default setting change process applied when said first processor changes the print setting based on said setting change process selected among from said multiple setting change processes, said setting change process being received from said image forming device.

10. The printing system according to claim 8, wherein
said first processor further configured to store in the second storage determination information to determine whether or not said setting change process is within the range matching said printing rule, and
said first processor further configured to determine whether or not said setting change process received from said image forming device matches said printing rule based on said determination information, and updates said setting change process applied when said first processor changes the print setting based on said selected setting change process if determining that said setting change process matches said printing rule.

11. The printing system according to claim 7, wherein
said second processor further configured to change the print setting of the print job received from said print server based on said setting change process changed by said second processor and producing a printed output.

12. A print server receiving a print job having an original print setting over a network and outputting the print job to an image forming device connected to said network, comprising:
a storage configured to store a printing rule defining an output condition for printing, and a plurality of setting change processes associated within a range matching said printing rules, said plurality of setting change processes including a default setting change process and at least one different setting change process; and
a processor configured to:
notify a sender of a notification request of said printing rule and said plurality of setting change processes in response to receiving said notification request over said network; and
forcibly change said original print setting of the print job based on said setting change process selected by the user at receipt or transmission of the print job, thereby converting the print job to a print job matching said printing rule.

13. The print server according to claim 12, wherein
said processor further configured to update said setting change process applied at conversion of the print setting by said processor when said setting change process performed by said processor is received from the sender of said notification request after said processor sends the notification.

14. The print server according to claim 13, wherein
said processor further configured to change the print setting of the print job based on said setting change process selected in advance as default among from said multiple setting change processes,
said processor further configured to send the information relating to said multiple setting change processes for notifying the sender of said notification request of said setting change process performed by said processor, and
said processor further configured to change said default setting change process applied when said processor changes the print setting based on said setting change process selected among from said multiple setting change processes, said setting change process being received from the sender of said notification request.

15. The print server according to claim 13, wherein
said processor further configured to store therein determination information to determine whether or not said setting change process is within the range matching said printing rule, and
said processor further configured to determine whether or not said setting change process received from the sender of said notification request matches said printing rule based on said determination information, and updates said setting change process applied when said processor changes the print setting based on said selected setting change process if determining that said setting change process matches said printing rule.

16. An information processing device sending a print job having an original print setting to a print server capable of processing the print job based on a printing rule, comprising:
a processor configured to:
acquire from said print server, in response to sending a notification request to said print server, said printing rule and information relating to a plurality of setting change processes including a default setting change process and at least one different setting change process associated within a range matching said printing rules;
display said printing rule and details of said plurality of setting change process performed by said print server are displayed based on the information acquired by said processor;
change said setting change process performed by said print server from said default setting change process to the different setting change process in response to user operation to select as the information is being displayed; and
send said different setting change process selected by the user to said print server.

17. An image forming device requesting for a print job having an original print setting to a print server capable of processing the print job based on a printing rule and performing printing process based on the print job received from said print server, comprising:
a processor configured to:
acquire from said print server, in response to sending a notification request to said print server, said printing rule and information relating to a plurality of setting change process including a default setting change process and at least one different setting change process associated within a range matching said printing rules;
display said printing rule and details of said plurality of setting change processes performed by said print server are displayed based on the information acquired by said processor;
change said setting change process performed by said print server from said default setting change process to the different setting change process in response to a user operation to select as the information is being displayed on said display; and send said different setting change process selected by the user through said setting changing part to said print server.

* * * * *